United States Patent
Celik

(10) Patent No.: US 7,349,907 B2
(45) Date of Patent: Mar. 25, 2008

(54) METHOD AND APPARATUS FOR STORING AND RETRIEVING BUSINESS CONTACT INFORMATION IN A COMPUTER SYSTEM

(75) Inventor: Feyzi Celik, Hopkinton, MA (US)

(73) Assignee: OnePIN, Inc., Westborough, MA (US)

(*) Notice: Subject to any disclaimer, the term of this patent is extended or adjusted under 35 U.S.C. 154(b) by 533 days.

(21) Appl. No.: 11/056,022

(22) Filed: Feb. 11, 2005

(65) Prior Publication Data
US 2005/0149487 A1 Jul. 7, 2005

Related U.S. Application Data

(63) Continuation-in-part of application No. 10/879,331, filed on Jun. 29, 2004, which is a continuation-in-part of application No. 10/657,757, filed on Sep. 8, 2003, now Pat. No. 7,296,036, which is a continuation of application No. 09/223,129, filed on Dec. 30, 1998, now Pat. No. 6,374,259.

(60) Provisional application No. 60/102,614, filed on Oct. 1, 1998.

(51) Int. Cl.
G06F 17/30 (2006.01)
(52) U.S. Cl. .................................... 707/10
(58) Field of Classification Search .............. None
See application file for complete search history.

(56) References Cited
U.S. PATENT DOCUMENTS

| 4,654,793 A | 3/1987 | Elrod |
| 4,774,618 A | 9/1988 | Raviv |
| 4,945,218 A | 7/1990 | Talbott |
| 5,483,052 A | 1/1996 | Smith, III et al. |

(Continued)

FOREIGN PATENT DOCUMENTS

WO   WO 97/01137   1/1997

(Continued)

OTHER PUBLICATIONS

George Kambourakis et al., "Delivering Attribute Certificates over GPRS", 2004, ACM, NY, NY, pp. 1166-1170.*

(Continued)

*Primary Examiner*—Diane Mizrahi
(74) *Attorney, Agent, or Firm*—Mintz, Levin, Cohn, Ferris, Glovsky and Popeo, P.C.

(57) ABSTRACT

The present invention provides an information management system comprising a remote device, a remote database operatively coupled to the remote device, the remote database containing contact information for each of a plurality of users of the information management system, wherein each of the users is assigned a unique user identifier, and the information for each user is stored along with the unique user identifier of the user in the remote database, wherein the remote device includes a wireless network interface module that interfaces with a wireless network to allow users of the information management system to access the remote device, a database interface module that coordinates transfer of data between the remote database and the remote device, and an application module to enable a wireless network user to access the remote database over the wireless network using a second network device to retrieve information in the remote database related to a first user having an assigned unique user identifier.

17 Claims, 20 Drawing Sheets

U.S. PATENT DOCUMENTS

| | | |
|---|---|---|
| 5,493,105 A | 2/1996 | Desai |
| 5,590,197 A | 12/1996 | Chen et al. |
| 5,604,640 A | 2/1997 | Zipf et al. |
| 5,612,524 A | 3/1997 | Sant' Anselmo et al. |
| 5,640,565 A | 6/1997 | Dickinson |
| 5,671,279 A | 9/1997 | Elgamal |
| 5,671,282 A | 9/1997 | Wolff et al. |
| 5,678,041 A | 10/1997 | Baker et al. |
| 5,689,654 A | 11/1997 | Kikinis et al. |
| 5,692,073 A | 11/1997 | Cass |
| 5,715,399 A | 2/1998 | Bezos |
| 5,732,229 A | 3/1998 | Dickinson |
| 5,740,549 A | 4/1998 | Reilly et al. |
| 5,774,117 A | 6/1998 | Kukkal et al. |
| 5,791,991 A | 8/1998 | Small |
| 5,793,972 A | 8/1998 | Shane |
| 5,794,219 A | 8/1998 | Brown |
| 5,794,232 A | 8/1998 | Mahlum et al. |
| 5,806,043 A | 9/1998 | Toader |
| 5,848,412 A | 12/1998 | Rowland et al. |
| 5,987,136 A | 11/1999 | Schipper et al. |
| 6,115,711 A | 9/2000 | White |
| 6,161,113 A | 12/2000 | Mora et al. |
| 6,161,124 A | 12/2000 | Takagawa et al. |
| 6,185,553 B1 | 2/2001 | Byrd et al. |
| 6,346,881 B1 * | 2/2002 | Davidson .................... 340/514 |
| 6,868,451 B1 | 3/2005 | Peacock ..................... 709/231 |
| 2001/0044321 A1 * | 11/2001 | Ausems et al. ............. 455/556 |
| 2004/0093317 A1 | 5/2004 | Swan ............................ 707/1 |
| 2004/0249846 A1 | 12/2004 | Randall et al. ............. 707/102 |
| 2005/0021571 A1 | 1/2005 | East ............................ 707/201 |
| 2005/0102328 A1 | 5/2005 | Ring et al. .................. 707/201 |
| 2006/0290496 A1 * | 12/2006 | Peeters .................... 340/572.1 |

FOREIGN PATENT DOCUMENTS

| | | |
|---|---|---|
| WO | WO 98/03923 | 1/1998 |
| WO | WO 98/06055 | 2/1998 |
| WO | WO 98/24036 | 6/1998 |

OTHER PUBLICATIONS

Ulrike Meyer et al., "A man-in-the-middle attack on UMTS", 2004, ACM, NY, NY, pp. 90-97.*

International Search Report for PCT/US06/38589, mailed Apr. 30, 2007.

* cited by examiner

METHOD AND APPARATUS FOR STORING AND RETRIEVING BUSINESS CONTACT INFORMATION IN A COMPUTER SYSTEM

RELATED APPLICATIONS

This application is a continuation-in-part of patent application U.S. Ser. No. 10/879,331, filed Jun. 29, 2004, which is a continuation-in-part of patent application U.S. Ser. No. 10/657,757, filed Sep. 8, 2003, which is a continuation of patent application U.S. Ser. No. 09/223,129, filed Dec. 30, 1998, now U.S. Pat. No. 6,374,259, which claims priority from U.S. Ser. No. 60/102,614, filed Oct. 1, 1998 (Abandoned), each of which is incorporated herein by reference.

FIELD OF THE INVENTION

Embodiments of the present invention are directed generally to a method and an apparatus for storing information in a computer system, and for retrieving the information from the computer system. More specifically, embodiments of the present invention are directed to a method and apparatus for storing and retrieving business contact information over a wireless network.

BACKGROUND OF THE INVENTION

The use of business cards is widespread in virtually all industries and professions, and the problem of efficiently organizing business cards can be appreciated by most people. Various solutions have been presented for solving this problem. These solutions include manual schemes in which business cards are organized in a binder, a notebook or some similar apparatus. Prior art solutions also include computer-based systems wherein information on a business card is scanned into a computer and stored in a database in the computer. While these solutions offer some help in relieving the organization problem associated with business cards, it is desirable to provide a more efficient, easy to use system of organizing business cards, and more particularly, for organizing information contained in business cards.

A second problem associated with the use of business cards is that the information contained on business cards cannot typically be updated once a card has been distributed. In today's fast-paced business world, it is not uncommon for the information on a person's business card to change frequently. It is desirable to provide a system for organizing business cards that allows information contained on the business cards to be periodically updated.

The use of wireless devices and PDA's to store information, such as information contained on a business card, is widespread for both business and personal use. Wireless devices, for example phones, require manual entry of contact numbers and upon the change of a contact's phone number, the user of the phone is required to change the number in the phone's memory by manually entering the new number. Further, if a cell phone user changes phone services or simply replaces his or her phone, the entries of the address book of the old phone must be entered into the new phone. Known caller ID systems may allow a caller's number to be stored in the phone, and the name of the caller can be linked to the number for storage in memory. Generally, however, data entered in phones for storage is restricted to a phone number or a plurality of phone numbers for each user, and data in a PDA or phone is static, requiring the user to manually update the contact data in the device.

SUMMARY OF THE INVENTION

Embodiments of the present invention provide systems and methods for organizing and updating contact information that overcome the problems associated with contact information management described above.

In one general aspect, the invention features an information management method. The information management method includes stages of assigning a first user a unique user identifier, storing information related to the first user in a remote database operatively coupled to a remote device, and enabling a second user to access the remote database over a wireless network using a second device to retrieve the information related to the first user by retrieving the unique user identifier.

Embodiments of the invention can include one or more of the following features. The stage of enabling access to the remote database can include retrieving the unique user identifier electronically by receiving a communication from the first user on a second user device. The method can also include retrieving the unique user identifier electronically during the outgoing call to the second user on the first user device. The method can also include retrieving the unique user identifier or phone number electronically through the infrared component of the devices. The method can further include automatically transferring the unique identifier to the second device during the communication from the first user. Receiving a communication from the first user can include informing the second user of the first user's unique user identifier and the first user's phone number. Receiving a communication from the first user can include retrieving the first user's phone number from the "incoming call" information of the phone, from the existing phone numbers within the phonebook of the second user or from the phone network. Outgoing call to the second user can include informing the first user device of the second user identifier and the second user's phone number. The method can further include retrieving the second user's phone number from the "outgoing call" information of the phone, phonebook of the first user device or the phone network. Enabling access to the remote database to retrieve information related to the first user can include manually entering the unique user identifier or personal phone number into the second device.

Embodiments of the invention can further include one or more of the following features. The method can further include subscribing to a wireless service provider. The wireless service provider can assign the unique user identifier. The phone numbers can be used as the unique identifier or the phone numbers can be linked to the users' automatically assigned random unique identifiers within the remote database. Enabling access to the remote database to retrieve information related to the first user can include electronically retrieving the device specific RFID from the first device into the second device. The method can further include the RFID unique number of the device to be linked to the unique identifier of each user within the remote database. The method can also include a step of printing characters representative of the unique user identifier on a document. The document can be a business card. The method can also include a step of printing an image representative of the unique user identifier in the form of a barcode.

Still further embodiments of the invention may include one or more of the following features. The method can include establishing a second database of user information in the second device, and updating information in the second database of the second device by accessing information in the remote database. The second device can access the remote device over the internet or over a wireless network. The method can further include enabling the first user to access the remote device over a network using a first wireless device to edit the information related to the first user stored in the remote database. The method can include enabling the first user to access the remote device over a network using a personal computer to edit or otherwise access the information related to the first user stored in the remote database. The second device can include a second database, and the method can include synchronizing information in the second database with information contained in the remote database. The second device may include a chip that manages the communication. The chip can be a SIM Card, USIM Card, SIM+Card or Smart Card. The chip in the second device may have a second database or may have an access to a second database within the second device. The chip can include a database. The database can be linked to second device's database. The method can include a step of storing an authorized access list with the information for the first user, the authorized access list containing a list of users having authorized access to the information for the first user, and wherein the step of enabling access includes a step of checking whether the second user is on the authorized access list for the first user.

In general, in another aspect, the invention features an information management system. The information management system includes a remote computer, a remote database operatively coupled to the remote computer, the remote database containing contact information for each of a plurality of users of the information management system, wherein each of the users is assigned a unique user identifier, and the information for each user is stored along with the unique user identifier of the user in the remote database. The unique identifier can be a phone number. Phone numbers can be linked to unique identifiers within the remote database. The remote computer includes a network interface module that interfaces with a network to allow users of the information management system to access the remote computer, a database interface module that coordinates transfer of data between the remote database and the remote computer, and an application module to enable a wireless network user to access the remote database over the wireless network using a second network device to retrieve information in the remote database related to a first user having an assigned unique user identifier.

The system can further include a second database, and the application module includes instructions to provide updating of information in the second database with information in the remote database. The second database can include a synchronizer for synchronizing information between the second database of the second network device and the remote database. The application module can include instructions to enable the first user to access the remote database over the wireless network using a first network device to edit the information related to the first user stored in the remote database.

In yet another general aspect, the invention includes an information management system. The system includes means for assigning a first user a unique user identifier, means for storing information related to the first user in a remote database operatively coupled to a remote computer, and means for enabling a second user to access the first database over a wireless network using a second network device to retrieve the information related to the first user by utilizing the unique user identifier assigned to the first user. The information management system can enable a second user to access the information related to the first user by utilizing a link between the unique identifier and the phone number. The information management system can enable a second user to access the information to the first user by utilizing a link between the unique identifier and an RFID assigned to a personal device.

Embodiments of the invention can include one or more of the following features. The system can include means for providing the first user with a bar code representation of the unique user identifier. The means for enabling can include means for updating information in a second database of the second network computer by accessing information in the remote database. The system can further include means for enabling the first user to access the remote computer over a network using a first network computer to edit the information related to the first user stored in the remote database. The system can further include means for enabling the first user to access the remote computer over a network using a first network computer to edit the information related to the first user's personal device RFID's stored in the remote database.

BRIEF DESCRIPTION OF THE DRAWINGS

For a better understanding of the present invention, reference is made to the drawings which are incorporated herein by reference and in which.

DETAILED DESCRIPTION

Illustrative embodiments of the present invention, described below are directed to methods and systems for managing contact information, and in particular, business contact information such as that typically contained on a business card. However, embodiments of the present invention are not limited to methods and systems that manage business contact information, but rather, include methods and systems that manage other information as well.

Figure 1:
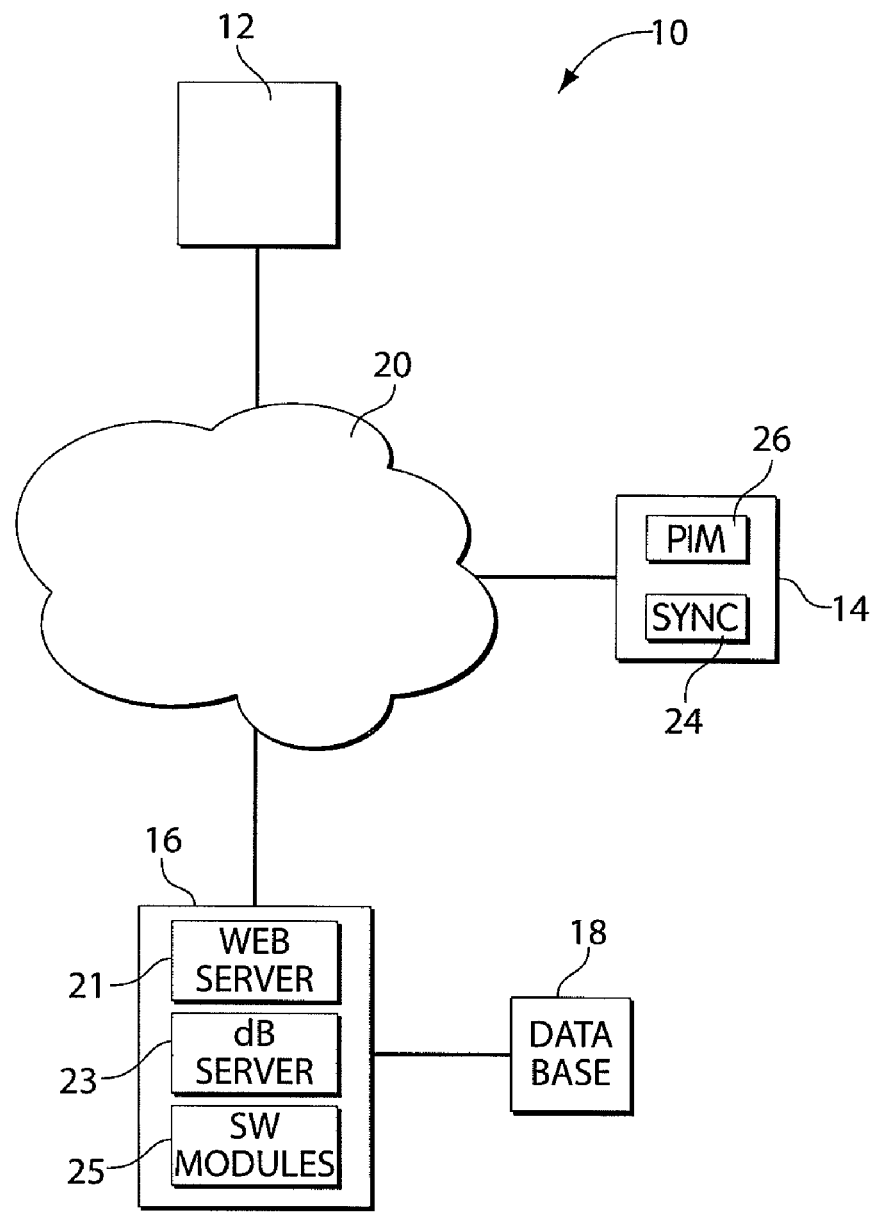
FIG. 1 is a block diagram showing one embodiment of a computer system used in embodiments of the present invention.
Figure 2A:
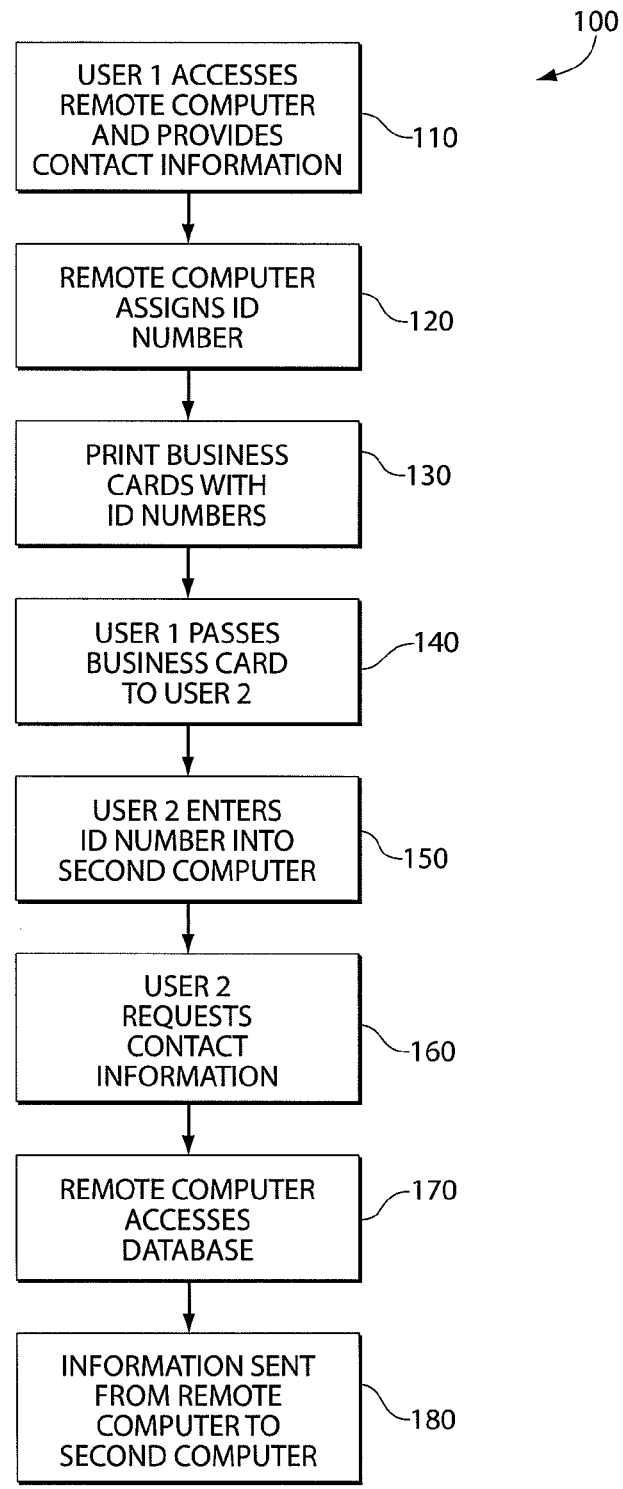
FIG. 2A is a flow chart of a method in accordance with one embodiment of the present invention.
Figure 2B:
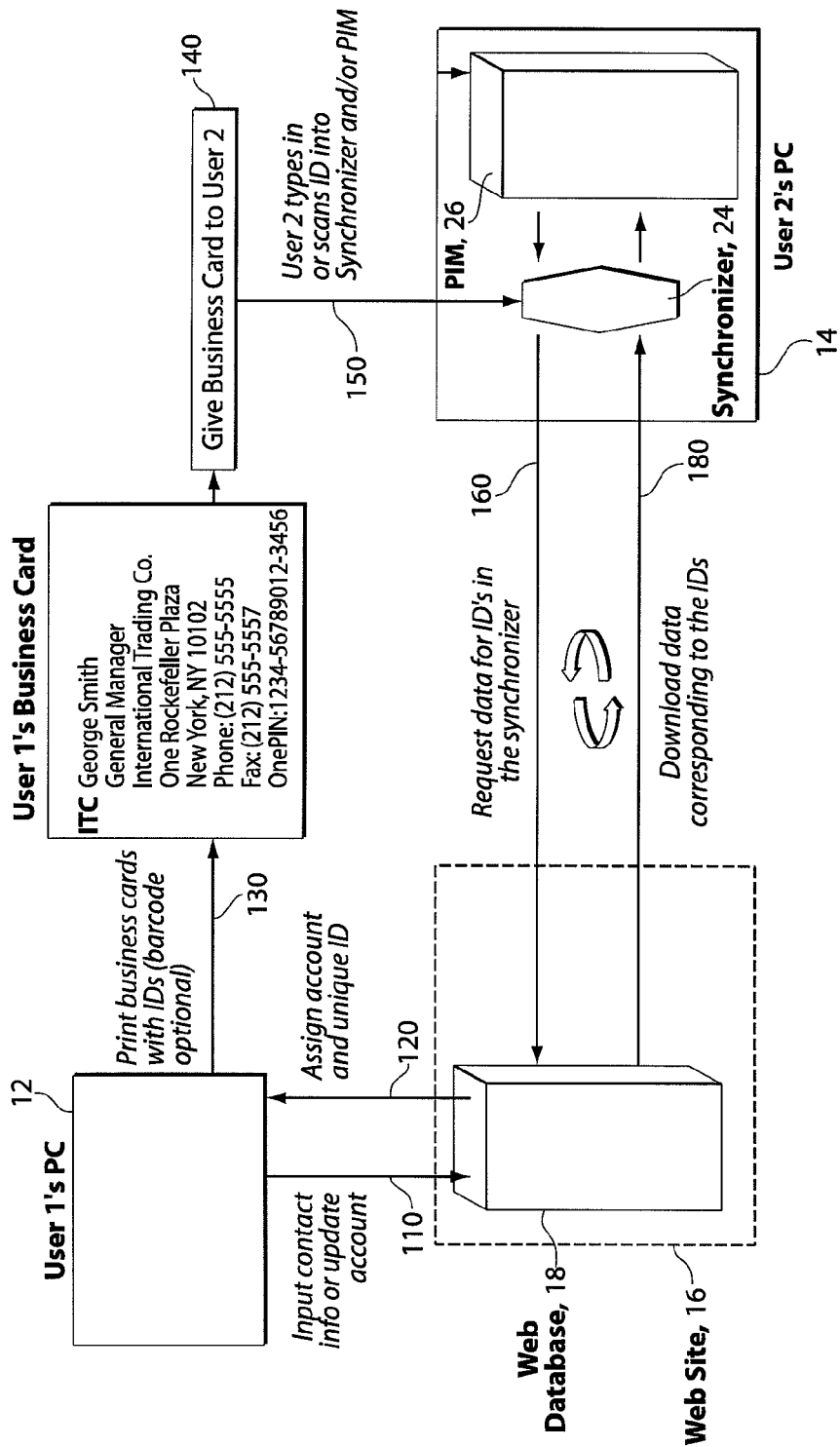
FIG. 2B is a block diagram demonstrating operation of the method of FIG. 2A in the computer system of FIG. 1.
Figure 3:
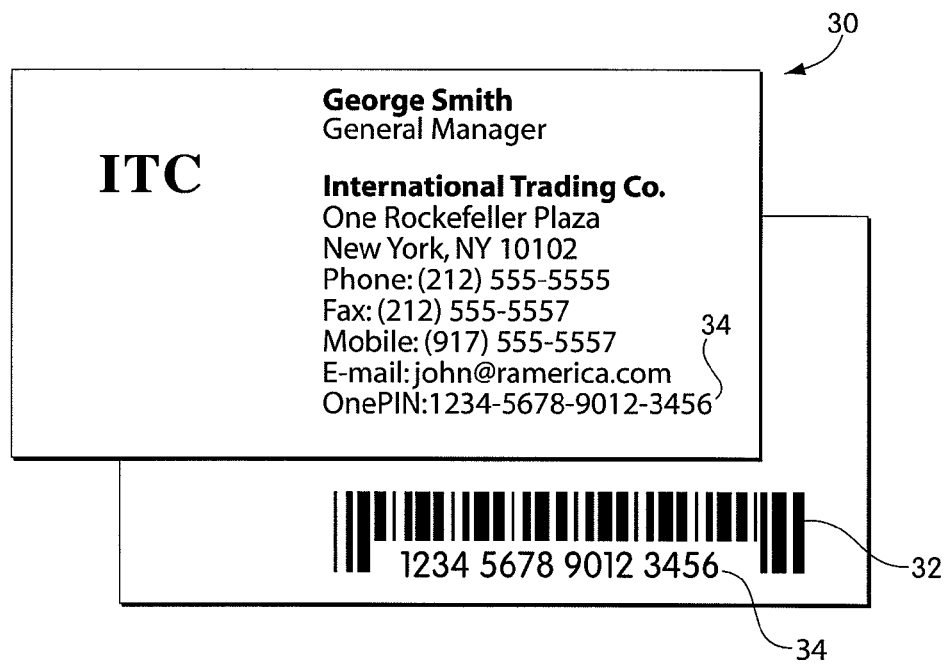
FIG. 3 is a diagram showing a business card used with embodiments of the present invention.

Embodiments of the present invention will now be described with reference to FIGS. 1-3. FIG. 1 shows a computer system 10 functioning as a contact information management system in accordance with one embodiment of the present invention. The computer system 10 includes a first personal computer 12, a second personal computer 14, and a remote computer 16 coupled to a database 18. The first computer and the second computer are coupled to the remote computer 16 over a network 20. In one embodiment of the present invention, the network 20 includes the internet, and the remote computer includes a web server and is accessible over the internet. The remote computer has an assigned uniform resource locator (URL) to allow the personal computers to access the remote computer over the internet. In other embodiments, the first and second personal computers may be coupled to the remote computer over a private dedicated computer network or the first and second personal computers may access the remote computer over a standard telephone line using a modem.

In one embodiment, the first computer 12 and the second computer 14 contain a web browser that enables the computers to access the remote computer over the internet using the URL of the web site, as is known in the art. In embodiments of the present invention, the web browsers may be implemented using one of several known internet browsers such as Navigator® available from Netscape Communications, Inc., preferably version 4.0 or higher, or Internet Explorer® available from Microsoft, Inc, preferably version 4.0 or higher.

As shown in FIG. 1, the second personal computer includes a synchronizer 24 and a personal information manager (PIM) 26. The PIM may be implemented using, for example, one of a number of personal information programs, such as Microsoft Outlook, Symantec's ACT! and 3COM's Pilot, that allow a user to maintain a database of contact information. The synchronizer may be implemented in embodiments of the present invention using software installed in the second computer. In embodiments of the present invention, the synchronizer may be implemented as a software utility downloadable over the internet from the remote computer 16. The synchronizer provides synchronization of contact information in the PIM with contact information contained in the database 18. In embodiments of the present invention, the first computer, as well as other computers coupled to the network 20, may also include a synchronizer and a PIM. In addition, in one embodiment, the synchronizer may be located in the remote computer in addition to or in place of the synchronizer in the second computer. Also, the synchronizer may be integrated into available PIM software.

A general method 100 in accordance with one embodiment of the present invention for operating the computer system 10 to implement a contact management system will now be described with reference to FIGS. 2A and 2B. In a first step 110 of the method, a user (hereinafter User 1) of the first personal computer 12 accesses the remote computer over the internet to input business contact information of User 1 or other information that User 1 wishes to store in the database 18. In response, in step 120, the remote computer 16 establishes an account for User 1, stores the contact information for User 1 in the database 18, and provides a unique user identifier for User 1. In embodiments of the present invention, the database 18 may contain contact information for a number of users each of whom is assigned a unique user identifier.

In the next step 130, User 1 (or a commercial printer selected by User 1) prints business cards for User 1 containing the unique user identifier, and in step 140, passes one of the business cards to a second user (hereinafter User 2). In one embodiment, in place of, or in addition to the unique user identifier, a bar code, or some other code representative of the unique user identifier, may be printed on the business card. FIG. 3 shows a business card 30 used with embodiments of the present invention having a bar code 32, representative of the user identifier, printed on the back, and having the unique user identifier 34, identified as a One-PIN™ number, printed on the front and on the back. In embodiments of the present invention, the bar code 32 and/or the unique user identifier 34 can be printed at other locations on the business card 30.

In one embodiment of the present invention, a 16-digit number and/or letter combination or any other symbol combination, such as an email address, can be used for the unique user identifier. The use of 16 digits for the user identifiers provides sufficient unique numbers to allow random assignment of numbers to users with low probability of an unauthorized user guessing the unique user identifier of an authorized user. In other embodiments, user identifiers may have more or less digits than 16. In addition, in embodiments of the present invention one of a number of known check sum schemes is used as part of a verification procedure of user identifiers.

In step 150 of the method 100, User 2 enters the unique user identifier of User 1 into the second computer 14. User 2 can enter the unique user identifier by typing the One-PIN™ number or by scanning the number into the synchronizer of the second personal computer using a wand, or some other bar code reader, coupled to the second personal computer 14. User 2 also can type in or scan the OnePIN™ number into the PIM. As discussed below, the user identifier is stored in the synchronizer and in the PIM of the second personal computer. The synchronizer and the PIM may already contain user identifiers for users of the contact management system other than User 1.

In step 160, the second personal computer 14 makes a request to the remote computer 16 for contact information corresponding to unique user identifiers contained in either the synchronizer or the personal information manager, and in step 170, the remote computer 16 accesses the database 18 to retrieve data corresponding to the user identifiers contained in the request from User 2. In step 180, the information retrieved from the database 18 is sent from the remote computer 16 to the second personal computer 14, wherein contact information for users corresponding to the unique user identifiers contained in the request in step 150 is updated in the PIM. The request provided in step 150 can be for contact information of User 1 or for contact information of several users, each of whom is identified by a unique user identifier. Users that have been assigned user identifiers may access the database through the remote computer to edit the contact information contained for them in the web database at any time.

In the embodiment of the present invention described above, the computer system 100 has two users, as understood by those skilled in the art, other embodiments of the present invention may include computer systems having many more users than two, and the web database may contain contact information for a large number of users.

The architecture of the computer system 10 in accordance with one embodiment of the present invention will now be described in further detail. The remote computer 16 includes a web server 21 to provide access to the internet and includes a database server 23 to provide access to the database 18. The remote computer also includes application specific software modules 25 that implement functions of the computer system 10 in conjunction with the web server and the database server. The web server 21, the database server 23, and the software modules 25 may be contained within one computer or may be installed in separate networked computers that together comprise the remote computer 16. In a preferred embodiment, the operating system used for the computer or computers comprising the remote computer is Microsoft's Windows NT® operating system. In this preferred embodiment, the web server is implemented using Microsoft's Internet Information Server (IIS), version 4.0 or higher, and the database server is implemented using Microsoft's SQL Server, version 6.5 or higher. The web server includes application specific Active Server Pages to implement functionality of systems and methods of the present invention. In addition, in this preferred embodiment, the software modules 25 contain software code written in object oriented programming paradigm. In one embodiment, this includes an n-tiered architecture with a database layer including interfaces and stored procedures; a middle ware layer including MS Com models, JAVABEANS, and third party languages; and a client interface layer using Javascript, DHTML, PEAR and ASP.

Figure 4A:
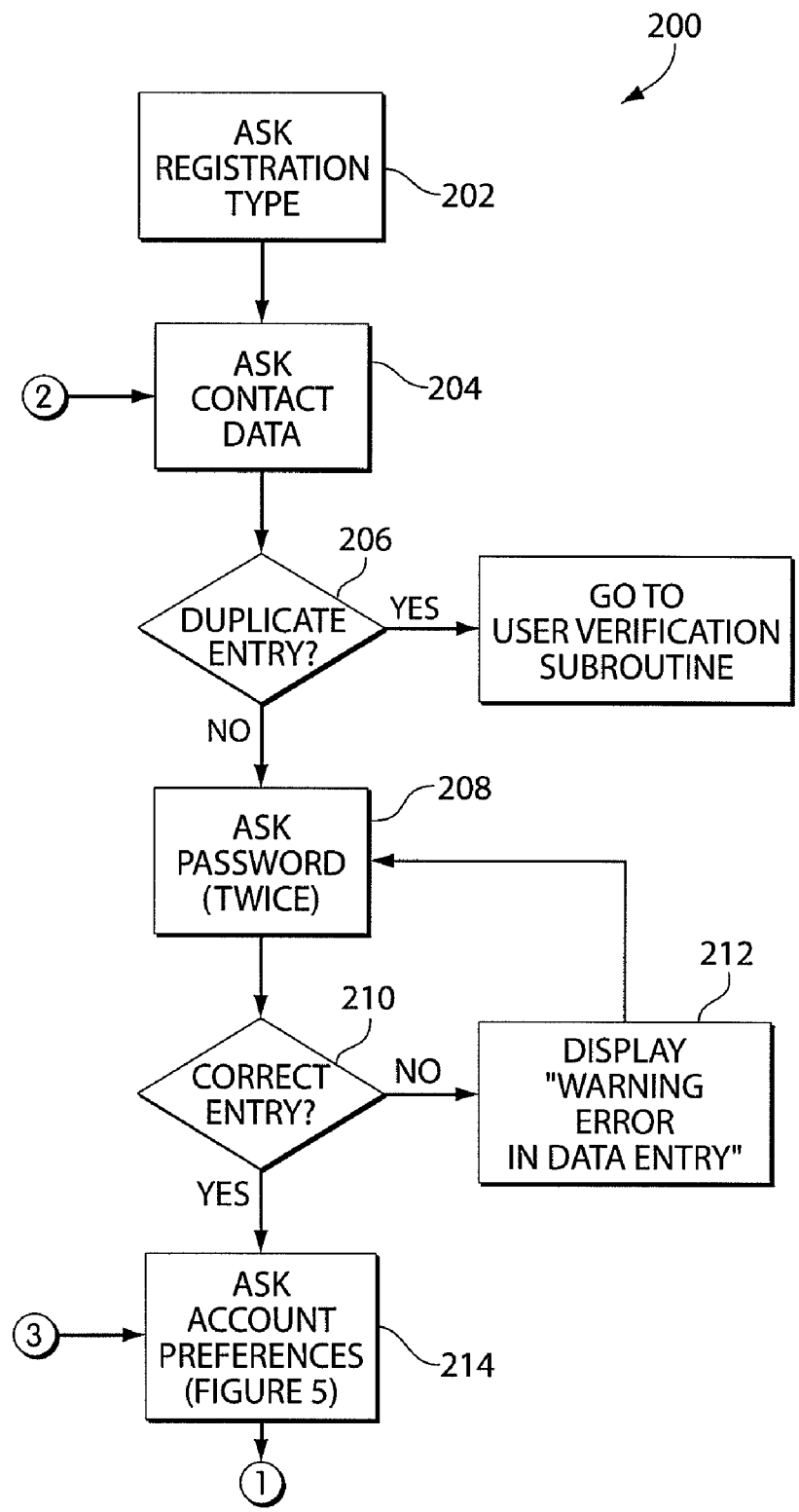
FIGS. 4A-4C show a flow chart of a registration process used in embodiments of the present invention.
Figure 4B:
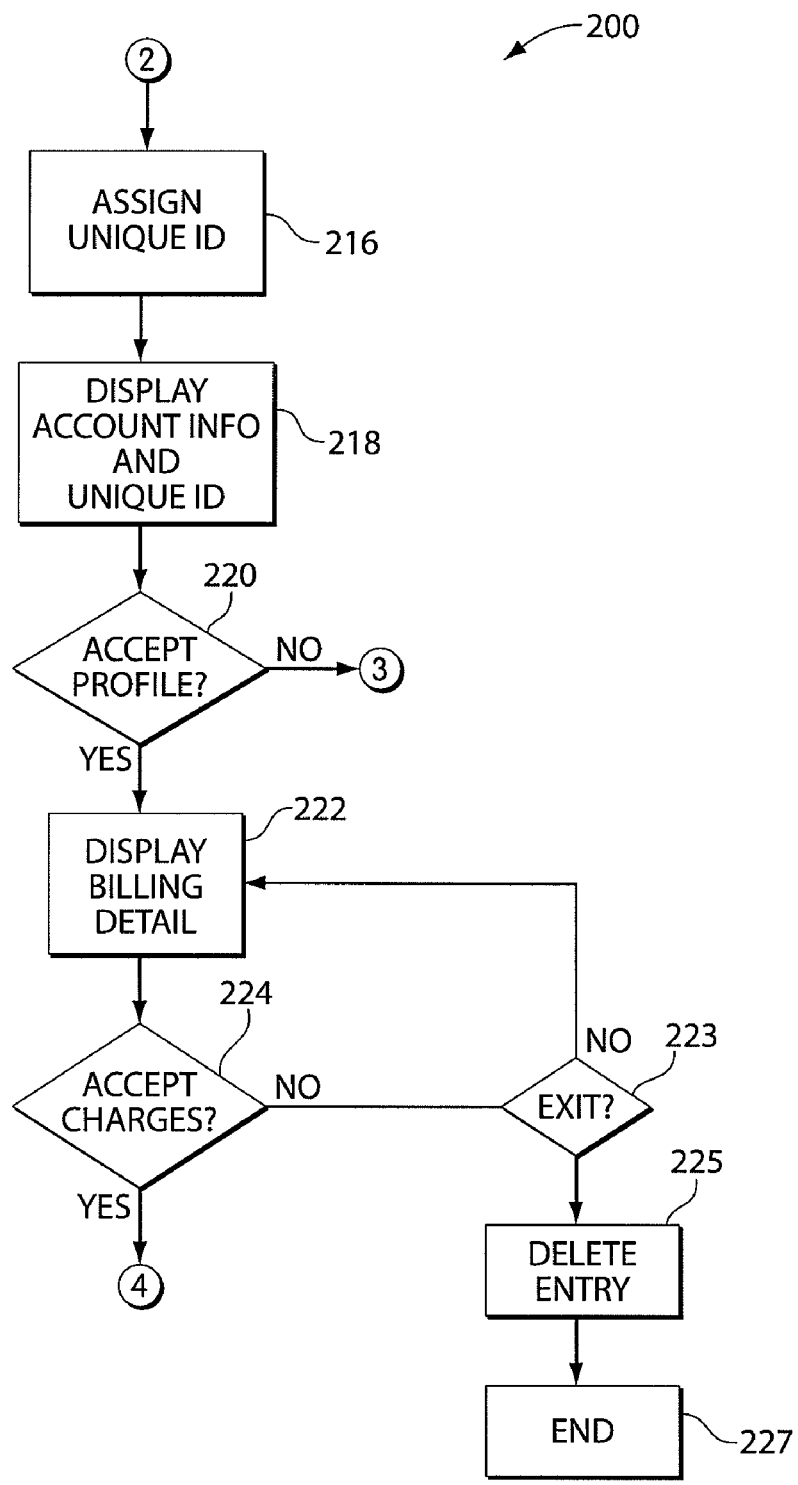
Figure 4C:
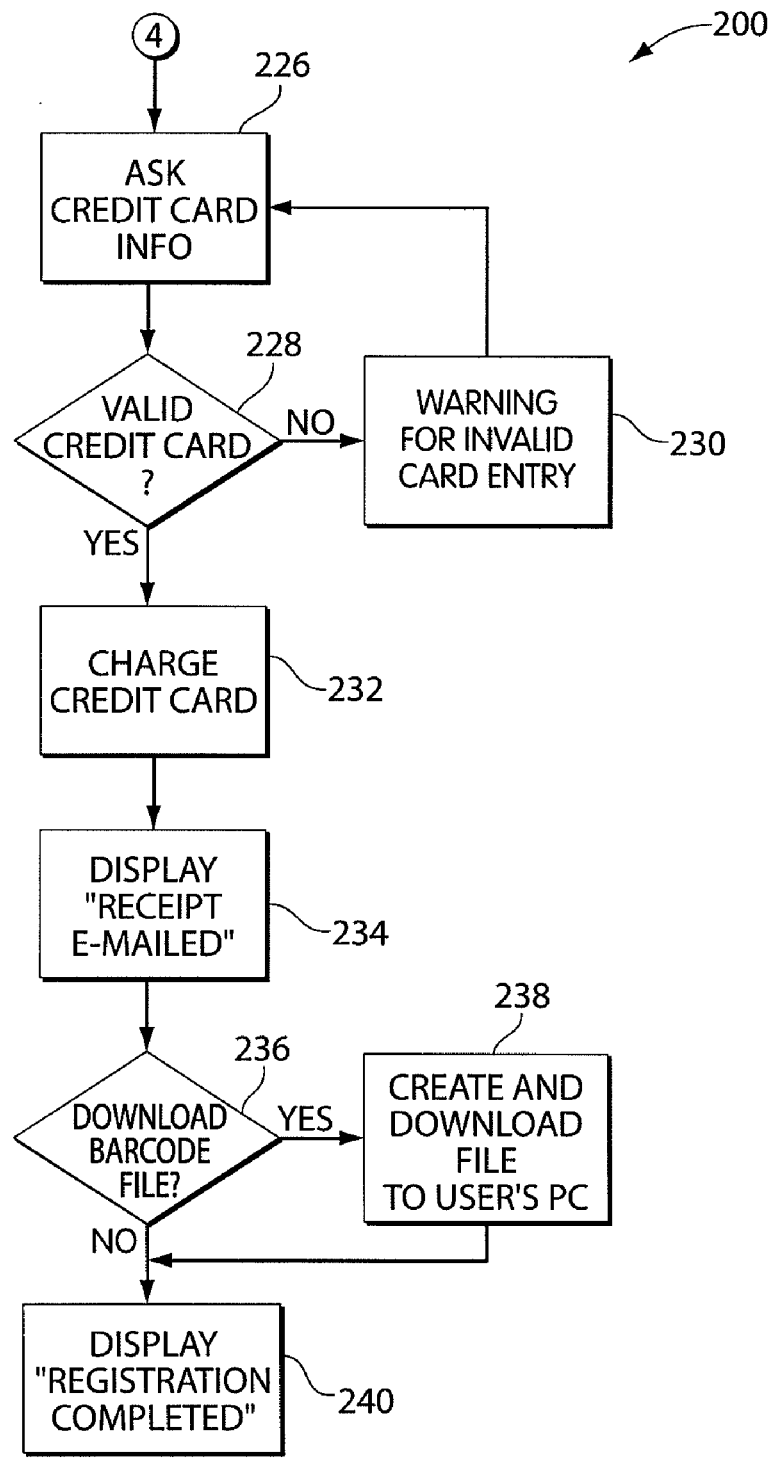

The steps of method 100 described above, as well as additional functions that may be implemented in contact information management methods and systems of the present invention, will now be described in further detail. FIGS. 4A-4C provide a flow chart of a registration procedure 200 of the remote computer 16 that allows a user, such as User 1, to register with a contact information management system of the present invention. In a first step 202 of the procedure 200, the system asks the user to provide a registration type. In embodiments of the invention, a variety of registration types may be used to distinguish a number of different services and/or payment plans that are available to users. For example, in one embodiment, there are different registration types for professionals, corporations, individuals, and children.

After the user selects a registration type, in step 204, the system asks the user to input contact data. The contact data includes, for example, the user's name, telephone numbers, facsimile numbers, pager number, home address, business address, employer, title, E-mail address, and any other information the user wishes to make available to other users of the contact information management system. Once the contact information is entered, then in step 206 the system attempts to determine whether the user has previously registered with the system. In one embodiment, the system makes this determination by scanning the database for names matching that input by the user, and if any matching names are found, the system compares the e-mail address of the user with the matching name with that input by the user to determine if a duplicate entry has been made. If the system determines that a duplicate entry has been made, then the registration process 200 terminates and the system performs a user verification process.

The user verification process allows a prior-registered user who has forgotten his/her password to verify his/her identity and change his/her password. In one embodiment, the user is requested to enter either their mother's maiden name or the last four digits of their social security number to verify their identity. Once their identity has been verified, the user is allowed to change their password. The user verification process allows users who have forgotten their passwords to access the system without creating unwanted and memory consuming duplicate entries.

If in step 206 a duplicate entry is not found, then in step 208, the user is asked to establish a password, selected by the user, by entering the password twice. In step 210, the system determines whether the user entered the same password twice. If the outcome of step 210 is "NO", then in step 212, a warning message is provided to the user and the process then returns to step 208. If the outcome of step 210 is "YES", then the password entered by the user is assigned to the user.

Figure 5:
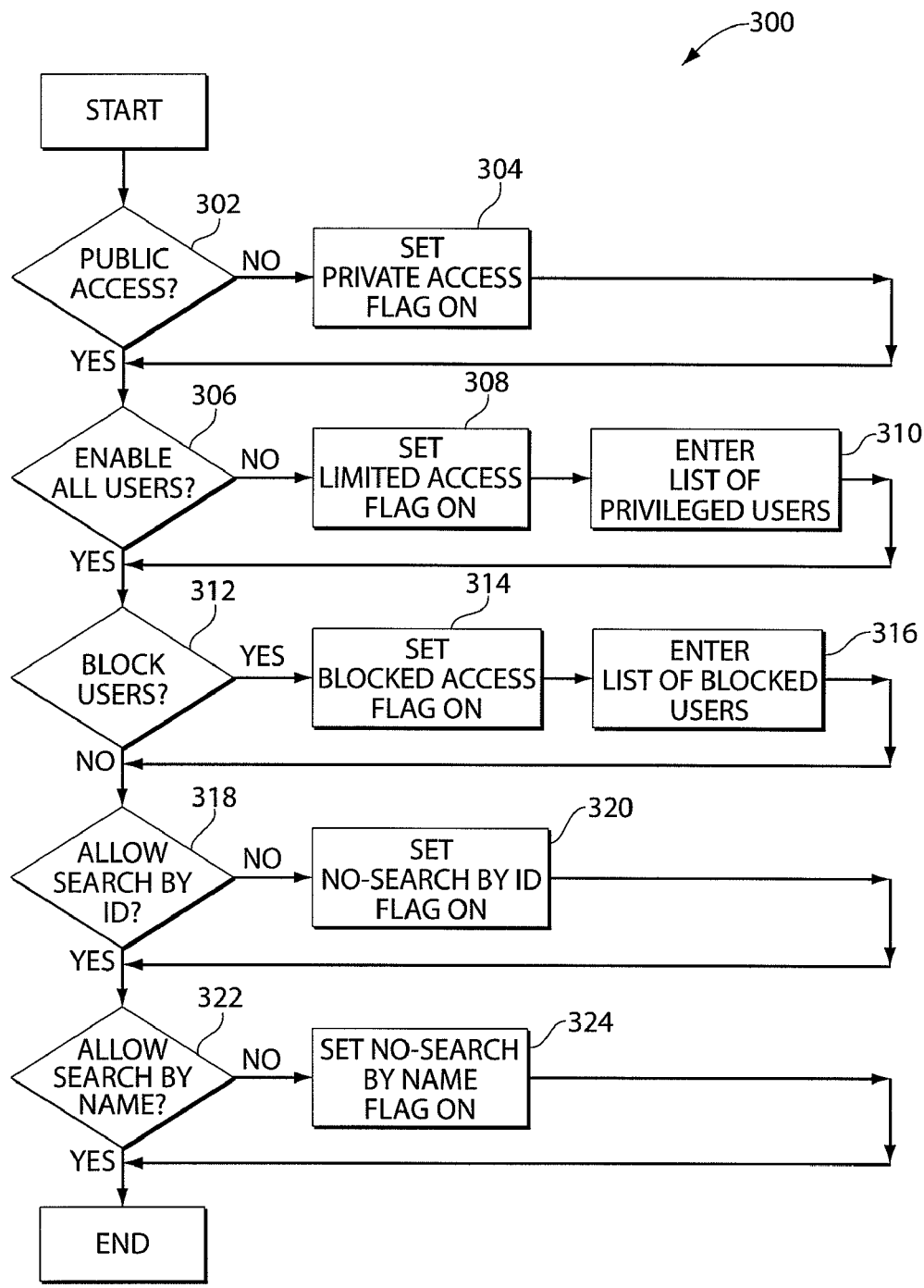
FIG. 5 is a flow chart of a process for establishing user preferences used in embodiments of the present invention.

The process continues with step 214, wherein account preferences are established for the user. In one embodiment, account preferences are established using a process 300 which will now be described with reference to FIG. 5. In a first step 302 of the process 300, the system queries the user as to whether the user wishes to allow public access to the user's contact information. If the response to the query in step 302 is "NO", then a private access flag is set on for the user in step 304, and the process continues with step 306. If the response to the query in step 302 is "YES" then process 300 proceeds directly to step 306.

In step 306, the system queries whether the user wishes to allow access to the user's contact information by all registered users of the contact management system. If the response to the query in step 306 is "NO", then a limited access flag is set on for the user in step 308, and in step 310, the user is asked to enter a list of user identifiers of privileged users that will be allowed access to the user's contact information. Process 300 then continues with step 312. If the response to the query in step 306 is "YES" then process 300 proceeds directly to step 312.

In step 312, the system queries whether the user wishes to block access to the user's contact information by any specific registered users. If the response to the query in step 312 is "YES", then a blocked access flag is set on for the user in step 314, and in step 316, the user is asked to enter a list of user identifiers of blocked users that will be denied access to the user's contact information by the system. Process 300 then continues with step 318. If the response to the query in step 306 is "NO" then process 300 proceeds directly to step 318.

In step 318 of process 300, the system queries whether the user wishes to allow other users to search for his account to receive contact information using the user's unique user identifier. If the response to the query in step 318 is "NO", then in step 320, a "no-search by ID" flag is set indicating that the user's account is not retrievable using an user identifier search, and the process continues with step 322. If the response to the query in step 318 is "YES" then process 300 proceeds directly to step 322.

In step 322 of process 300, the system queries whether the user wishes to allow other users to search for the user's account to retrieve contact information using the user's name. If the response to the query in step 322 is "NO", then in step 324, a "no-search by name" flag is set indicating that the user's account is not retrievable using a name search, and process 300 ends. If the response to the query in step 318 is "YES" then process 300 ends. As understood by one skilled in the art, in step 214 of process 200, account preferences may be set for a user using a process other than process 300. Further, in other embodiments, users may be requested to select other preferences, either in addition to or in place of, the preferences selected in process 300.

After the user's account preferences are set in step 214 of process 200, a unique user identifier is assigned for the user in step 216. In one embodiment, the unique user identifier is assigned by randomly selecting an user identifier from a pool of available user identifiers. After an user identifier is assigned to a user, it is removed from the pool of available user identifiers. As discussed above, in one embodiment, the pool of available user identifiers includes 16 digit numbers that satisfy a check sum criteria.

Process 200 continues with step 218, wherein the system displays an account profile of the user. In one embodiment, the account profile includes a listing of the account preferences selected by the user and the user's unique user identifier. Next, in step 220, the user is asked if the profile is acceptable. If the response to step 220 is "YES", then the process continues with step 222. If the response to step 220 is "NO", then the process 200 returns to step 214 to allow the user to input new account preferences.

In step 222 of process 200, the system displays billing information for the user, and in step 224, the user is asked if the billing information is acceptable. In one embodiment, the billing information displayed in step 222 includes customized billing information for the user based on the type of registration selected in step 202 and based on the account preferences selected by the user. In step 224, the user is asked to accept charges for use of the contact information management system based on the billing information displayed in step 222. If the outcome of step 224 is "YES", then in step 226, the user is requested to provide information for a credit card to be used by the user to pay the charges. If the outcome of step 224 is "NO", then in step 223, the user is asked if they would like to exit the system. If the outcome of step 223 is "NO", then the process returns to step 222. If the outcome of step 223 is "YES", then in step 225, the entry for the user is deleted, and in step 225, the process ends.

In step 228, the system determines whether the credit card is valid using one of a number of known procedures. If the outcome of step 228 is "NO," indicating that the credit card is not valid, then in step 230 a warning indicating invalid card entry is displayed, and process 200 returns to step 226. In one embodiment, after a predetermined number of unsuccessful attempts by a user to enter a valid credit card number, process 200 ends. If the outcome of step 228 is "YES," indicating that the credit card entered is valid, then the process 200 continues with step 232, wherein the charges are applied to the user's credit card. The system then displays a message "receipt E-mailed" and sends an E-mail to the user to provide a receipt of the credit card transaction.

Next, in step 236 of process 200, the system generates a display to ask if the user would like a file containing a bar code corresponding to the user's assigned unique user identifier to be downloaded to the user's computer. If the response to the query in step 236 is "YES," then in step 238, the system creates and downloads to the user's computer a file containing the bar code. In one embodiment, the file containing the bar code is an encapsulated postscript file, however, other file formats could be used as well. After downloading the file, process 200 proceeds to step 240. If the response to the query in step 236 is "NO," then the process continues with step 240, wherein a message "REGISTRATION COMPLETED" is displayed. Process 200 terminates after step 240.

Figure 6:
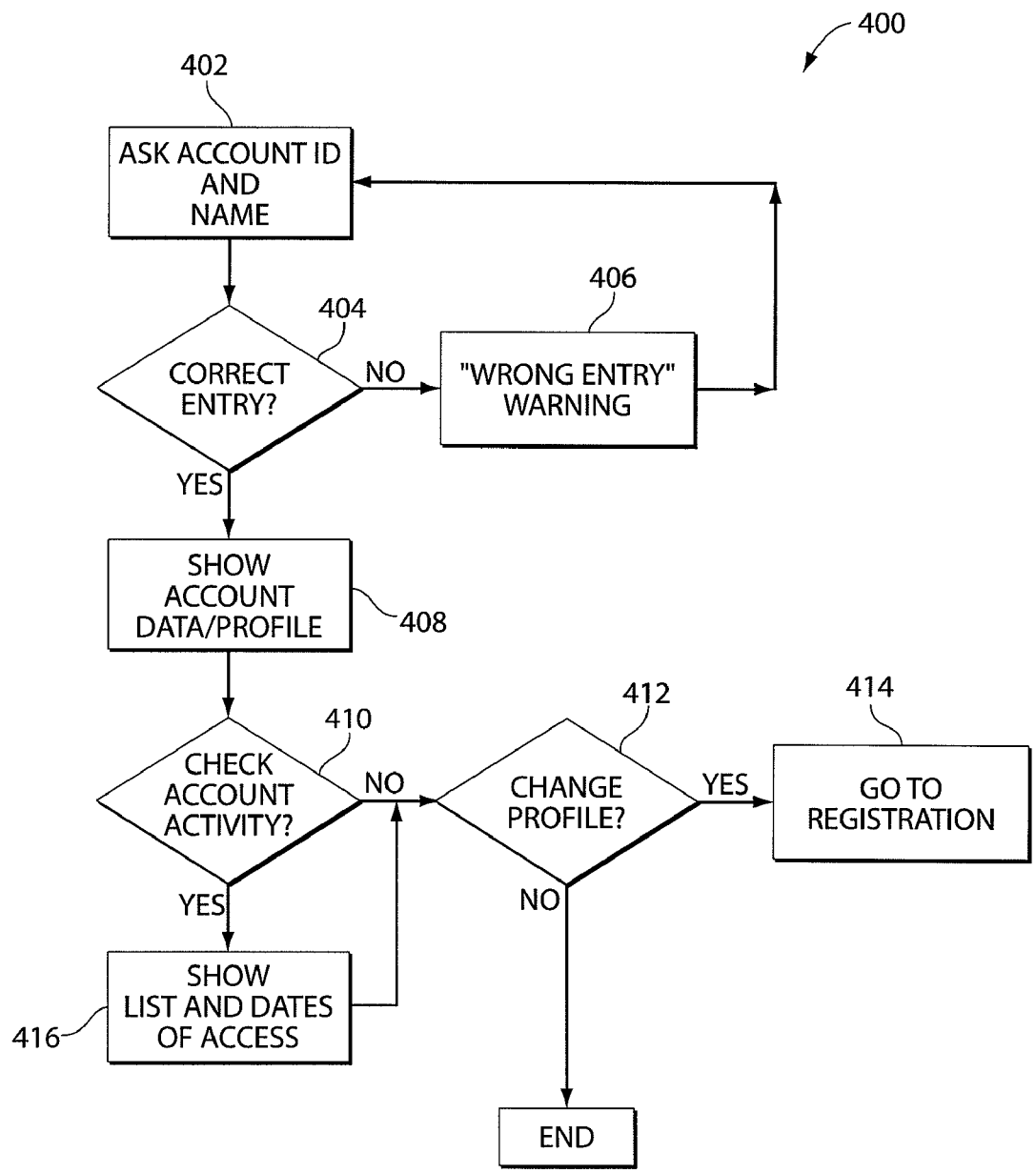
FIG. 6 is a flow chart of a login process used in embodiments of the present invention.

After a user has registered with contact information management systems of the present invention, the user can subsequently access the remote computer 16 to edit the contact data stored for the user or to check on account activity for the user's account established with the contact information management system. A process 400 for accessing the remote computer 16 in accordance with one embodiment of the present invention will now be described with reference to FIG. 6. In a first step 402 of the process 400, the user is asked to input the user's name and password. Next in step 404, the system verifies the name and password of the user. If the output of step 404 is "NO," indicating that the system was not able to verify the entered name and password, then in step 406, the system generates a display "WRONG ENTRY." The process 400 then returns to step 402. If the output of step 404 is "YES," indicating that the system was able to verify the entered name and password, then the process continues with step 408.

In step 408, the system displays a profile for the user. In one embodiment, the information displayed in step 408 is the same as that displayed in step 218 of process 200. The system then queries whether the user would like to check account activity in step 410. If the response to the query in step 410 is "YES," then in step 416, the system displays a list showing dates of access to the user's contact data by other users of the contact information management system. The process 400 then continues with step 412.

If the response to the query in step 410 is "NO," then the process 400 proceeds with step 412. In step 412, the system queries whether the user would like to change the user's profile. If the response to the query in step 412 is "YES," then in step 414, the user repeats portions of the registration process 200 to change profile data of the user. If the response to the query in step 412 is "NO," then process 400 ends.

Figure 7:
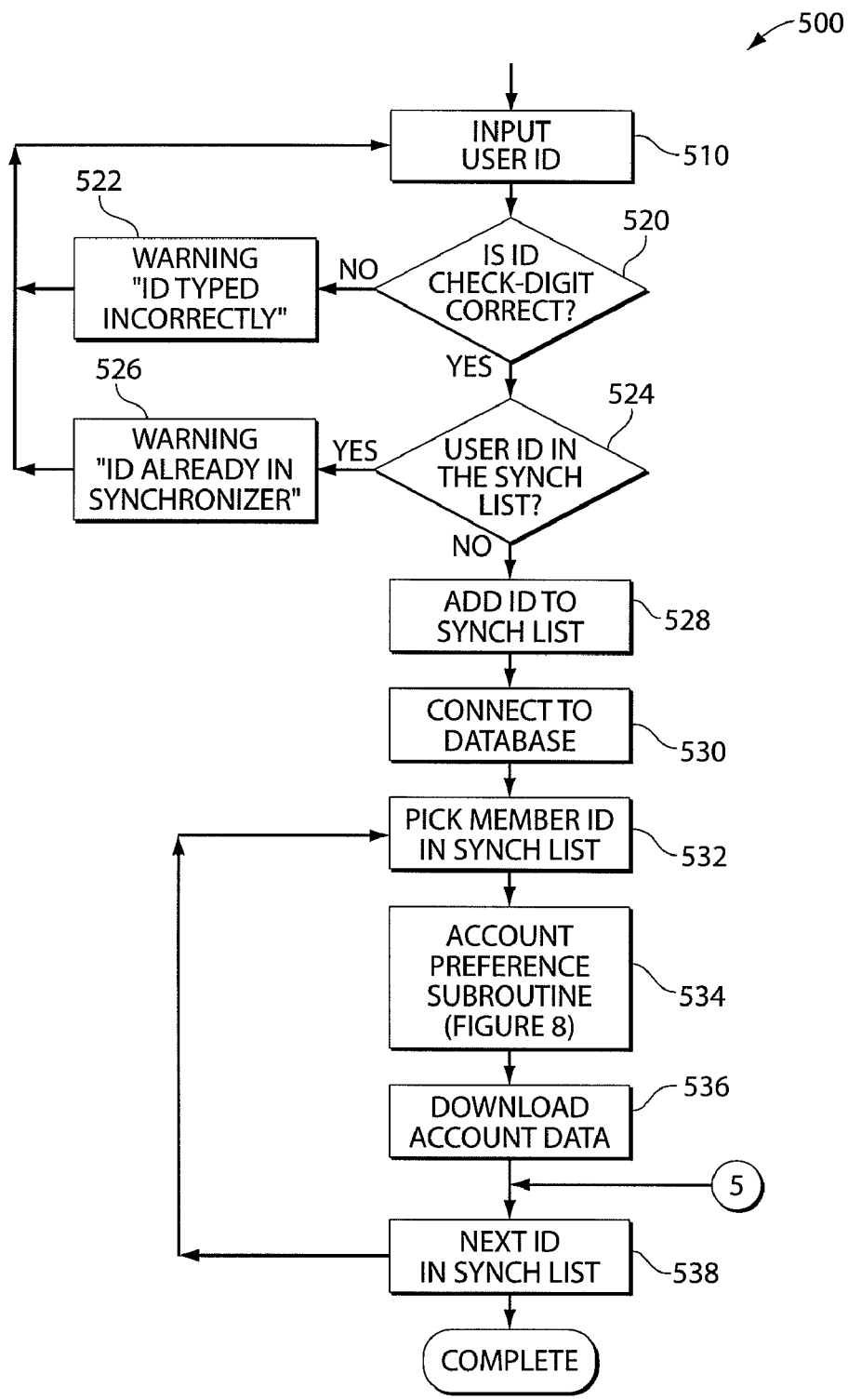
FIG. 7 is a flow chart of a synchronization process used in embodiments of the present invention.

The operation of the synchronizer in the second personal computer 14 of the computer system 10 will now be further described with reference to FIG. 7 which shows a flow chart of a synchronization process 500. The synchronization process 500 allows a user (User 2) to obtain and update data for registered users of the contact management system using the unique user identifiers of the registered users.

In a first step 510 of the process 500 a user identifier of User 1 is input into the synchronizer of the second computer. As described above, the user identifier can be input into the synchronizer using a bar code reader, by typing the number in using a keyboard, or using other data entry techniques. In step 520, the synchronizer determines whether a valid user identifier has been entered into the synchronizer. As discussed above, in some embodiments of the present invention, a check sum scheme is used for the user identifiers, and this scheme can be used in step 520 to verify numbers entered. If the outcome of step 520 is "NO" indicating that the number entered is not a valid user identifier, then in step 522 an error message is displayed, and the process returns to step 510.

If the outcome of step 520 is "YES", then the process 500 continues with step 524, wherein the system checks whether the user identifier entered into the system is already stored in a synchronizer list in the synchronizer. If the outcome of step 524 is "YES," then in step 526 a warning message is displayed, and the process returns to step 520. If the outcome of step 524 is "NO," then in step 528, the user identifier is added to the synchronization list.

Figure 8:
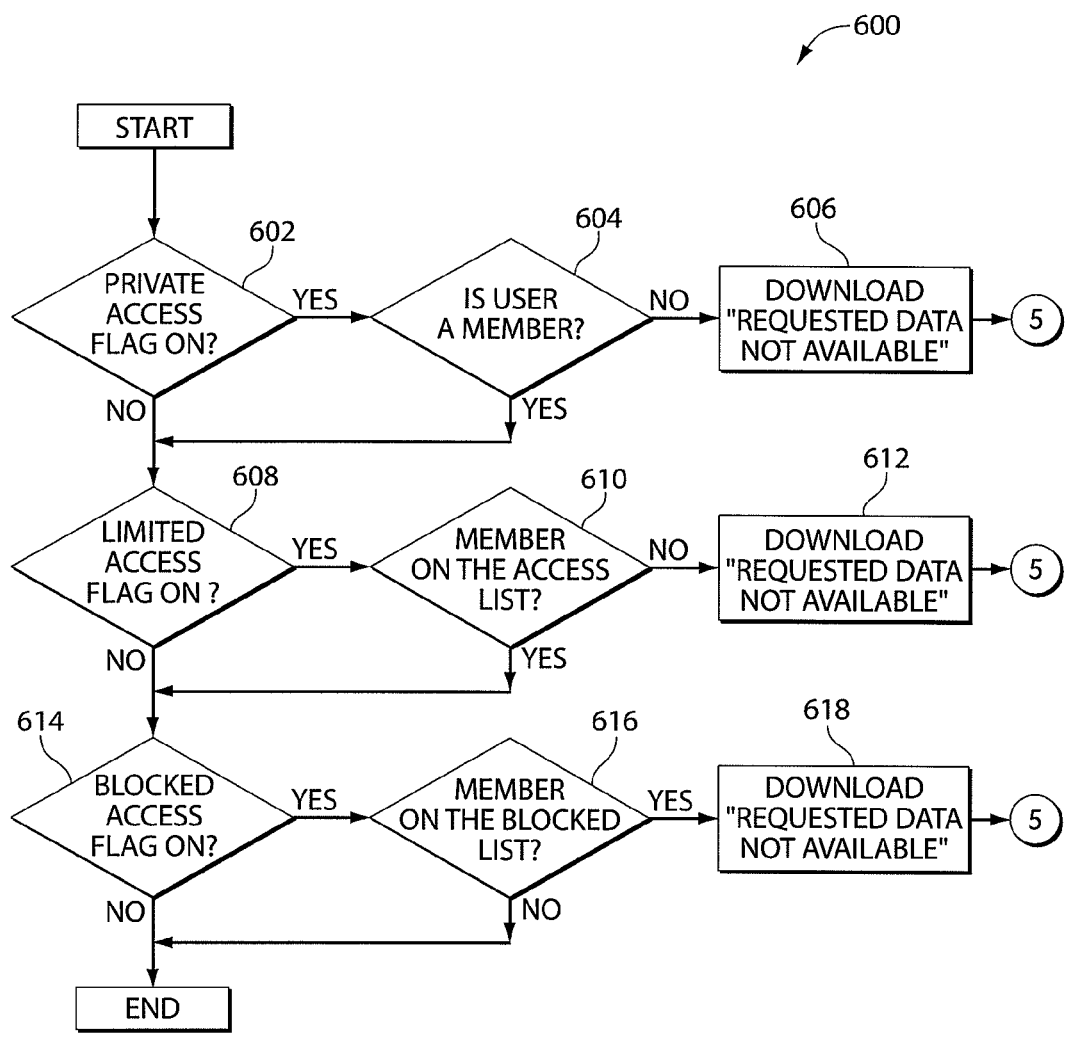
FIG. 8 is a flow chart of an account preferences subroutine used in the synchronization process of FIG. 7.

The synchronizer then connects to the database through the remote computer to obtain contact information of User 1 and to update contact information of other users whose user identifier is contained in the synchronizer list. Next, in step 532, the synchronizer selects one user identifier from the synchronizer list, and in step 534, an account preferences subroutine is conducted for the user identifier selected in step 532. The account preferences routine reviews preferences established by the user corresponding to the user identifier selected in step 532 to determine whether User 2 should be allowed access to the contact information. One embodiment of an account preferences subroutine 600 used with process 500 will now be described with reference to FIG. 8.

In a first step 602 of the process 600, a determination is made as to whether the private access flag has been set on for the user identifier. If the outcome of step 602 is "YES," then in step 604, a determination is made as to whether User 2 is a registered member of the contact information management system. If the outcome of step 604 is "NO," then the process 600 proceeds to step 606, wherein a message "Requested Data is not Available" is sent to User 2. Process 600 then returns to step 538 of process 500. If the outcome of step 604 is "YES," or if the outcome of step 602 is "NO," then the process 600 continues with step 608.

In step 608, a determination is made as to whether the limited access flag has been set on for the user identifier. If the outcome of step 608 is "YES," then in step 610, a determination is made as to whether User 2 is on an access list established by User 1. If the outcome of step 610 is "NO," then the process 600 proceeds to step 612, wherein a message "Requested Data is not Available" is sent to User 2. Process 600 then returns to step 538 of process 500. If the outcome of step 610 is "YES," or if the outcome of step 608 is "NO," then the process 600 continues with step 614.

In step 614, a determination is made as to whether the blocked access flag has been set on for the user identifier. If the outcome of step 614 is "YES," then in step 616, a determination is made as to whether User 2 is on a blocked access list established by User 1. If the outcome of step 616 is "YES," then the process 600 proceeds to step 618, wherein a message "Requested Data is not Available" is sent to User 2. Process 600 then returns to step 538 of process 500. If the outcome of either step 614 or step 616 is "NO," then the process 600 ends and process 500 continues with step 536.

In step 536 of process 500, contact information for the user corresponding to the user identifier selected in step 532 is downloaded to the second computer wherein it is stored in the PIM of the second computer. Next, in step 538, the process returns to step 532 wherein a next user identifier in the synchronizer list is selected. Process 500 continues with steps 532 to 538 until contact information for all user identifiers in the synchronizer list has been downloaded to the second computer. In one embodiment of the present invention, a copy of all unique numbers in the synchronizer may also be stored in the remote database and be accessible by User 2 through an "Account Login" screen of the remote computer. This allows User 2 to access the remote computer and remote database from a computer other than the second computer to obtain contact information.

Figure 9:
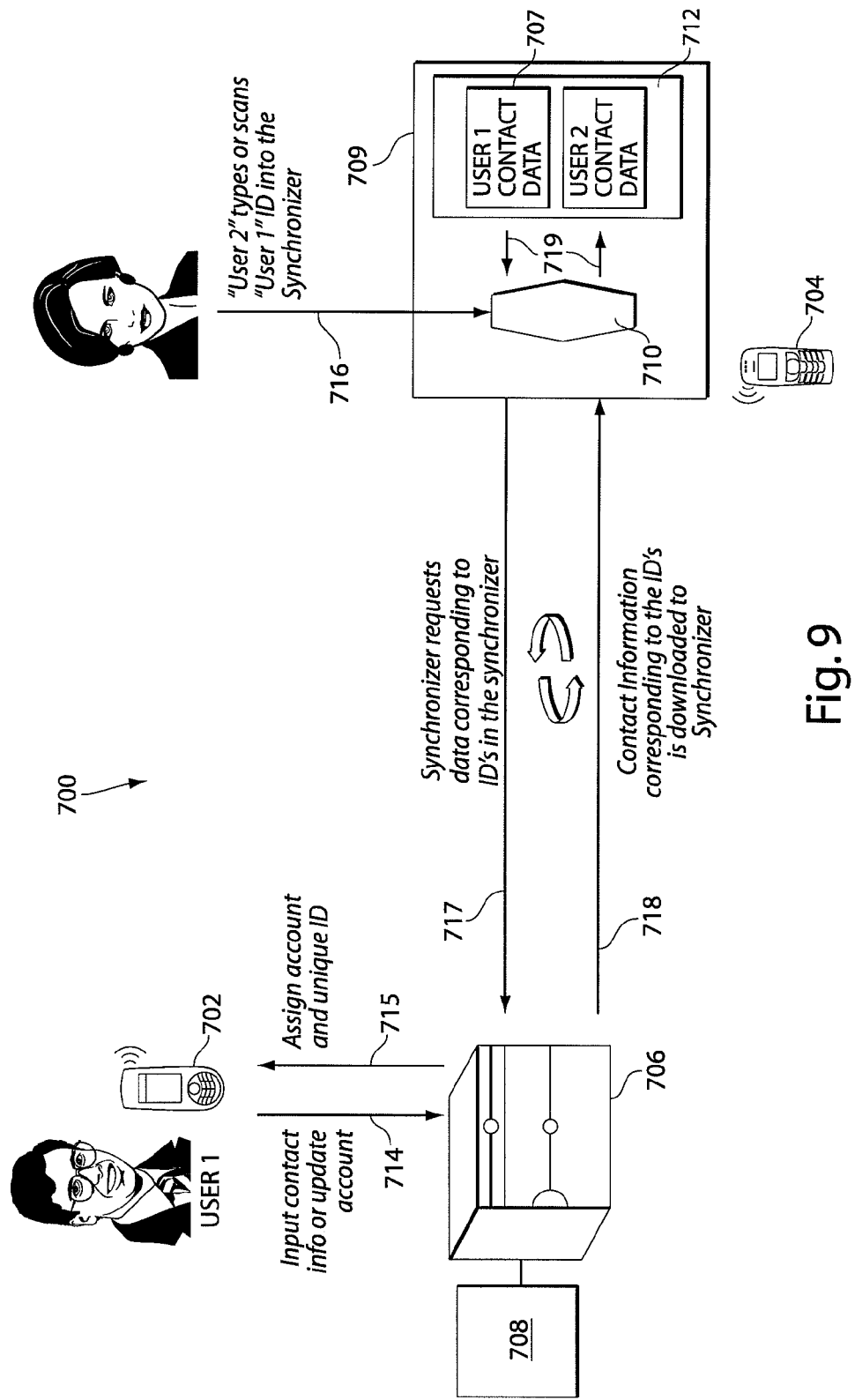
FIG. 9 is a diagram showing a wireless system used in embodiments of the invention.

In an alternative and preferred embodiment of the invention, the contact management information system operates over a wireless network. For simplification, cellular phones are used as an example of wireless devices in the following description of the invention. Referring to FIG. 9, a wireless contact management information system 700 includes a first user phone 702, a second user phone 704, and a remote computer 706 coupled to a database 708. The first user phone 702 and the second user phone 704 are connected to the remote computer 706 over a wireless network. The wireless network includes the internet, and the remote computer includes a web server and is accessible over the internet. The remote computer has an assigned uniform resource locator (URL) to allow the wireless phones to access the remote computer over the internet. In the embodiment shown in FIG. 9, the first user phone contains a web browser 707 that enables access to the remote computer over the internet. The second user phone 704 may also include a web browser 707.

Each wireless device, such as the first user phone 702 and the second user phone 704, is linked to the database 708. The first and second user phones 702, 704 interact with the database 708 via a web connection through remote computer 706. The second user phone 704 includes a phone module 709. The phone module 709 is integrated into the phone software and operate as a part of the phone's systems for interaction with the remote database 708. The phone module 709 may be implemented in the first user phone 702 or the second user phone 704 using software installed in the phone. The second user phone 704 also includes a synchronizer 710 to allow maintenance of contact information received from the remote computer 706 and database 708. Further, the second user phone 704 includes a phone address book 712, or PIM. The first user phone 702, as well as other user phones coupled to the wireless network, may also include a synchronizer 710. The remote computer 706 may include a synchronizer 710 in place of or in addition to synchronizers in the user phones. The phone module 709 and the synchronizer 710 can be a single software program.

A method of using the contact information management system 700 over a wireless network is now described. With reference to FIG. 9, the user of the first user phone 702 (hereinafter "User 1") connects to the remote computer 706 and inputs contact information or updates contact information pertinent to User 1 at stage 714. If an account and user ID is not already assigned to User 1, at stage 715, a unique identifier is assigned.

At stage 716, the user of the second user phone 704 (hereinafter "User 2") types or scans the User 1 unique identifier into the browser 707 of the second user phone 704. User 1 may also send the User 1's unique identifier by beaming to the second user phone 704, using each phone's integrated wireless infrared component. Preferably, a communication from User 1 is sent to User 2 with a display of User 1's phone number and unique identifier. The synchronizer and the PIM may already contain user identifiers for users of the contact management system other than User 1. The synchronizer 710 of the second user phone 704 requests data corresponding to User 1 from the database of the remote computer at stage 717. At stage 718, contact information corresponding to the personal identification of User 1 is downloaded to the wireless synchronizer 710 of the second user phone 704. In step 719, the information retrieved from the database 708 is sent from the remote computer 706 to the User 2's phone 704, wherein contact information for users corresponding to the unique user identifiers contained in the request in step 717 is updated in the Address Book or PIM. User 2 accesses his/her phone address book or PIM 712 to acquire updated contact information related to User 1. The request provided in step 717 and 718 can be for contact information of User 1 or for contact information of several users, each of whom is identified by a unique user identifier. Users that have been assigned user identifiers may access the database through the remote computer to edit the contact information contained for them in the web database at any time. The method is substantially similar to the method of FIGS. 2A and 2B, discussed above and wherein contact with the remote database is made via separate user computers.

In one embodiment of the present invention, a copy of all unique numbers in the synchronizer may also be stored in the remote database and be accessible by User 2 through an "Account Login" screen of the remote computer. This allows User 2 to access the remote computer and remote database from a computer or other wireless device other than the second phone to obtain contact information.

Figure 10:
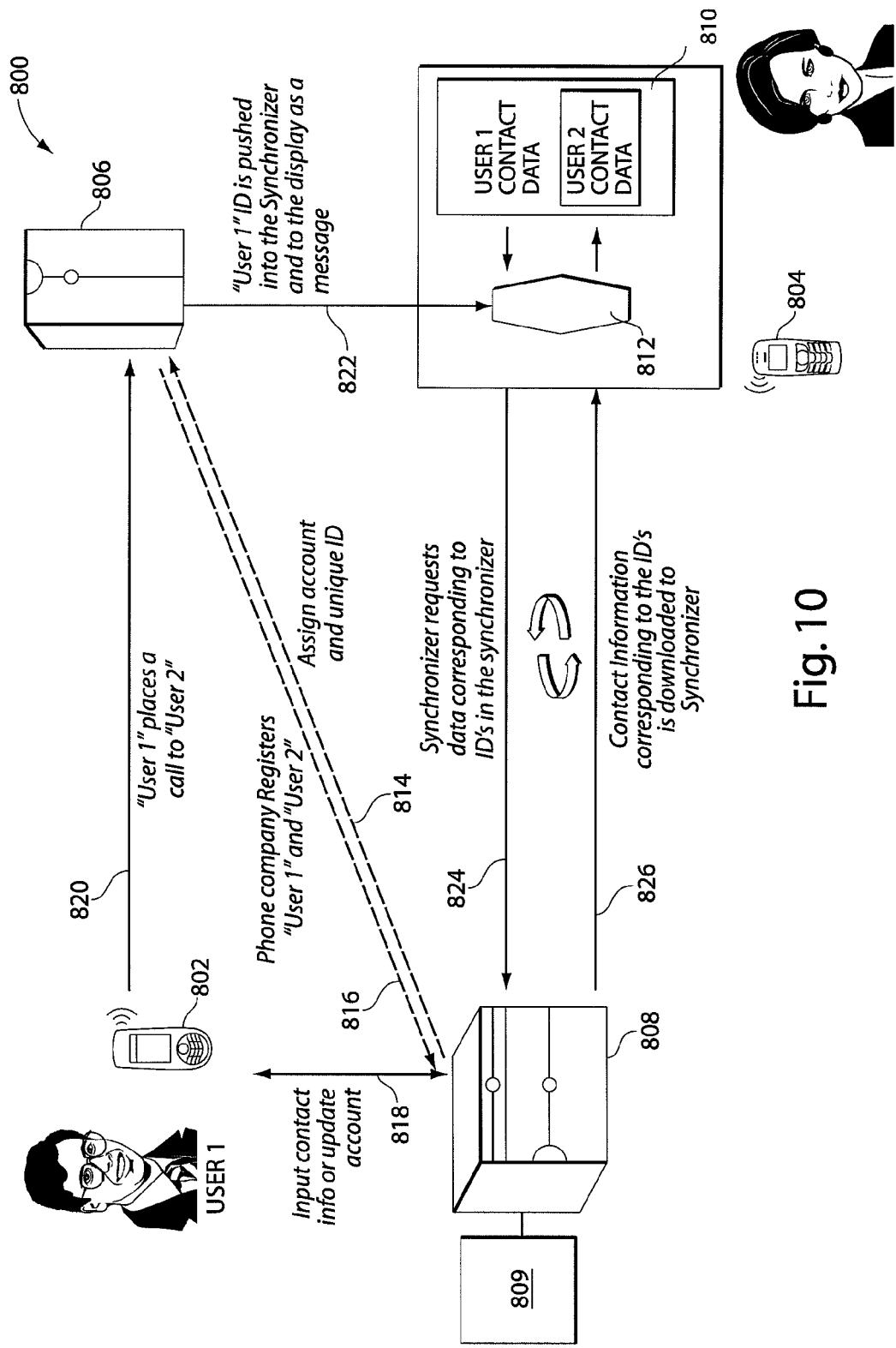
FIG. 10 is a diagram of an alternative wireless system used in embodiments of the invention.

Referring to FIG. 10, the contact information management system is implemented over a wireless network of a phone company or other wireless service provider. The contact information management system 800 includes a first user phone 802, a second user phone 804, a wireless service provider 806, and a remote computer 808 having a database 809. The second user phone 804 includes a phone address book or PIM 810 and a wireless synchronizer 812. The first user phone 802, as well as other user phones on the wireless network, can include a phone address book or PIM and a wireless synchronizer.

When a wireless device user, such as User 1 of the first user phone 802 and User 2 of the second user phone 804, buys or subscribes to a service plan or purchases a new phone from the wireless service provider 806, User 1 and User 2 are assigned a unique user identifier by the wireless service provider 806 using remote computer 808 coupled with remote database 809. The contact information management system 800 software is downloaded to each of the first user phone 802 and the second user phone 804. At stage 816, registration of a new user to the contact information management system 800 is accomplished through the wireless service provider 806. The remote computer 808 receives information from the wireless service provider and provides the unique identifier for each user, shown at stage 814. If the user already has a unique identifier, the wireless service provider 806 registers the user's existing identifier to the phone or other wireless device. Thereafter, User 1 and User 2, as subscribers to the network of the wireless service provider 806, can input contact information or update account information contained in the remote computer 808, as shown by stage 818.

A method of using the wireless contact information management system 800 between users is now described. User 1 places a call to User 2 via the wireless service provider 806, as shown in stage 820. The wireless service provider 806 allows the contact information of User 1 to be downloaded to the synchronizer 812 of the second user phone 804, as shown in stage 822. User 1 identification is presented to User 2 as a display on the second user phone 804. Preferably, User 1's phone number and unique identifier are presented to User 2. At stages 824 and 826, the synchronizer 812 requests data from the remote computer 808 corresponding to the unique identifier, and the remote computer 808 sends contact information corresponding to the unique identifier to the wireless synchronizer 812. User 2's phone automatically stores unique user identifiers when another user having an unique identifier calls the second user phone 804. User 1's contact information becomes accessible in the phone address book of User 2. User 2 did not manually enter the contact information of User 1, but the second user phone 802 contains the contact information via the transfer of the data from the remote computer 808. The second user phone 804 contains contact data related to User 1 that was entered remotely into the remote computer 808 by User 1. Alternatively, User 2 enters User 1's unique identifier into his/her wireless phone using the manual entry method described in FIG. 9.

User unique identifiers downloaded to the synchronizer 812 of the second user phone 804 are updated as the synchronizer 812 requests information from the remote computer 808. Requests from the synchronizer 812 are answered with data from the remote computer, which updates the synchronizer 812 of the device.

Figure 11:
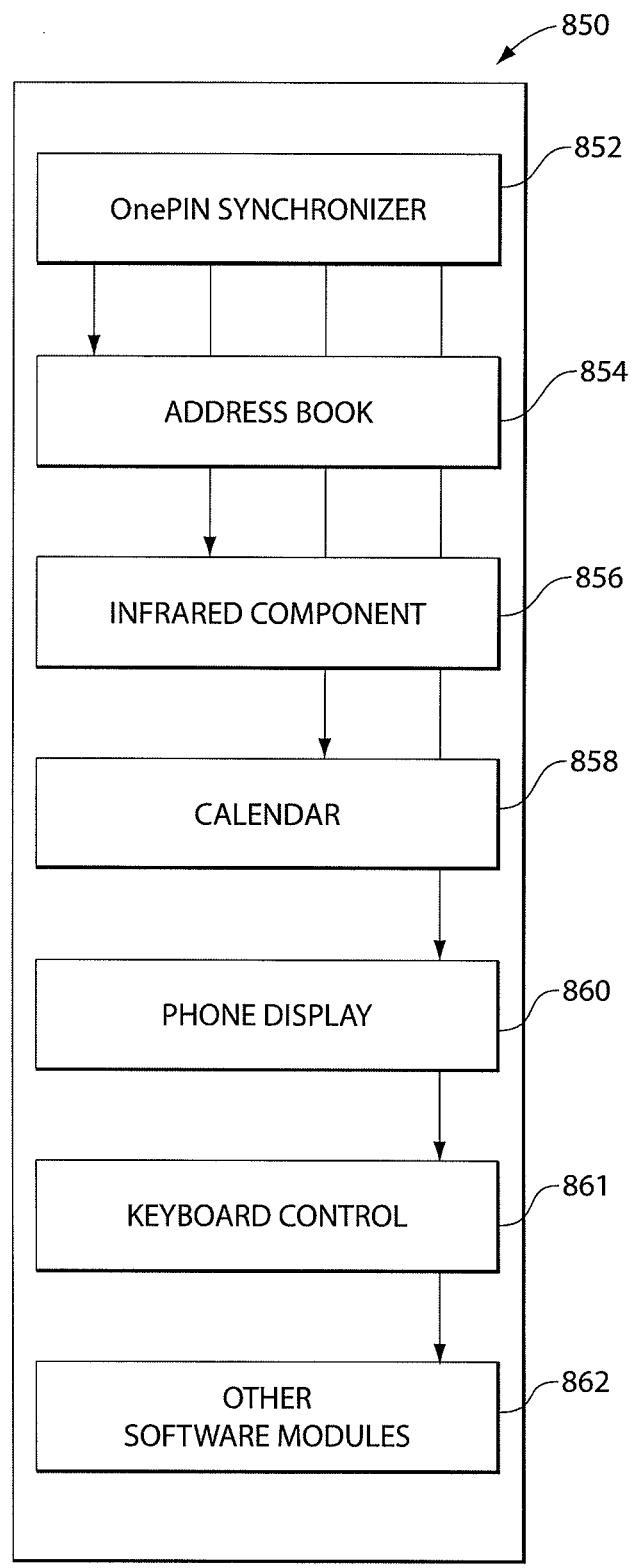
FIG. 11 is a block diagram of a device for use in a system of the invention.

Referring to FIG. 11, an operating system 850 employing the contact information management system is shown. Although the operating system 850 is presented as a phone operating system, the operating system can be effective for PDA's or other wireless devices, or for IP based landline phones. The operating system 850 includes a wireless synchronizer 852, an address book 854, an infrared component 856, a calendar 858, a phone display 860, a keyboard control 861, and other software modules 862. The wireless synchronizer 852 allows contact with a remote database storing contact information. The address book 854, the infrared component 856, the calendar 858, and the phone display 860 interact with the wireless synchronizer 852 to receive, store, and display updated and new information. The wireless synchronizer 852 is able to beam (send and receive) a user's unique identifier to other users' wireless devices via the infrared component 856. The wireless synchronizer 852 also adds new unique identifiers through manual entry of the unique identifier. Phone numbers and other contact information of a user's address book 854 are available through the wireless synchronizer 852, and, through a wireless service provider, the synchronizer 852 sends a signal to other subscribers of the contact information management system giving other users a unique identifier in conjunction with the wireless service provider 806 shown in FIG. 10. The synchronizer 852 can also collect other system users' identifiers and store the information.

In one embodiment of the present invention, a copy of all unique numbers in the synchronizer may be stored in the remote database and be accessible by User 2 through an "Account Login" screen of the remote computer. This allows User 2 to access the remote computer and remote database from a computer or other wireless device other than the second phone to obtain contact information.

Figure 12:
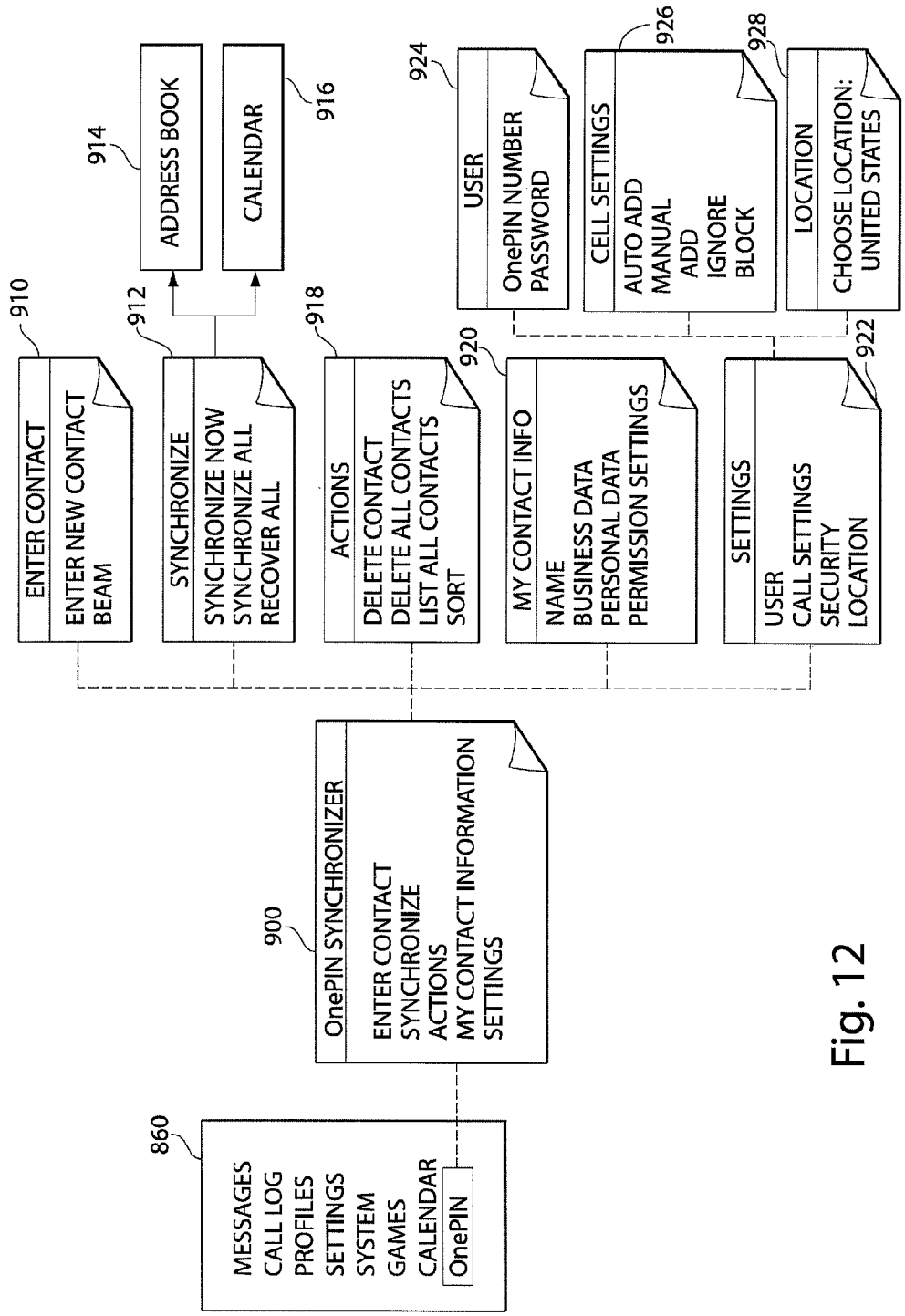
FIG. 12 is an information flow chart of a function of the device in FIG. 11.

With continued reference to FIG. 11 and referring to FIG. 12, an operating system menu 860 includes options, such as those profiled in the operating system 850. In the operating system menu 860, additional options are shown. Options include, but are not limited to, "messages", "call log", "profiles", "settings", "systems", "games", "calculator", "calendar", and "OnePIN™". The options appear as a display on the phone LCD screen. A user can choose the OnePIN™ function to update or utilize information contained in the database of the contact information management system. When OnePIN™ is chosen by the user, the synchronizer 852 options are displayed. The synchronizer 852 includes a menu 900 of various functions that can be chosen by the user. The user can enter a new unique identifier of another user by function 910. Entering a new user unique identifier into the synchronizer can be accomplished by manually entering an identifier, by using infrared technology between devices or by the RFID of another user's device, for example.

A Synchronize Function 912 allows a user to synchronize contact information of all the users with the unique identifier who were entered into the wireless device's synchronizer through the Synchronize Now function. The Synchronize All function allows the users to download information for all users with the unique identifiers and phone numbers within the synchronizer plus any additional unique identifiers the user may have at his or her web account at remote computer coupled with remote database. The Recover All function allows the users to recover and download information for all users with the unique identifiers the user may have at his or her web account at remote computer coupled with remote database. For example, the Recover All function 912 can be used when a user changes to a new device or subscribes to a different wireless provider having OnePIN™ capabilities. As a portion of the Synchronize Function 912, an address book 914 and a calendar 916 are updated and/or altered to reflect the new information. The address book 914 and the calendar 916 are connected to and interact with the Synchronize Function 912.

An Actions Function 918 allows the user to delete a contact, delete all contacts, list all contacts, and sort contacts. A My Contact Information Function 920 allows a user to review his/her own information to determine whether it is accurate. For example, a user's contact information can include name, business data, personal data, and permission settings. Business data can include title, place of business, directions to place of business, and business numbers. Personal data can include home phone numbers, home address, license plate number, insurance registration information, health insurance information, and emergency contacts. Permission settings stores the access preferences that a user designates for access to particular contact information. For example, a user may choose to allow everyone to access all of his contact information, only public contact information, or none of his contact information. A user may instead choose to allow OnePIN™ members to access his information. Further, the user can set one or a number of persons that are specifically given access, while blocking others.

A user chooses settings in the synchronizer 852, and change the settings when applicable. The Settings Function 922 includes a user field, a call settings field, a security field, and a location field. The user field 924 allows the user to enter his or her OnePIN™ number and password such that the user is authenticated and the User is allowed to use the OnePIN system. The user accesses his or her account at OnePIN which is password protected. The password has to match the user's current password and unique identifier combination at the remote server. The call settings field 926 includes an auto add option and a manual option. If the user chooses the auto add option, callers having a OnePIN™ number are automatically added to the user's synchronizer and address book. If the user chooses manual option, for each caller, the user chooses to add the new caller, ignore the new caller, or block the new caller's information from storage in the user's address book. When the user receives an incoming phone call, the phone display shows the incoming user number and unique identifier, and informs the user whether the caller is in the address book, or is a new caller. The screen allows the user to add a new caller to the address book, ignore the new caller's information, or block the caller from access to the user's contact data.

The Location Field 928 allows the user to choose the country location of use of the phone or other device. For example, if the user travels, the numbers in his/her address book will automatically be updated to include the country code and country specific access codes such that calls out of the country or within the country will be dialed without additional manual entries.

Referring again to FIGS. 9 and 10, a user assigned a unique identifier via the contact information management system through a wireless service provider or via the contact information management system is assigned the wireless account and a web account affiliated therewith. The wireless service provider can configure the web account during the phone activation. The web account is linked to the same unique identifier as is assigned for the wireless service.

Figure 13:
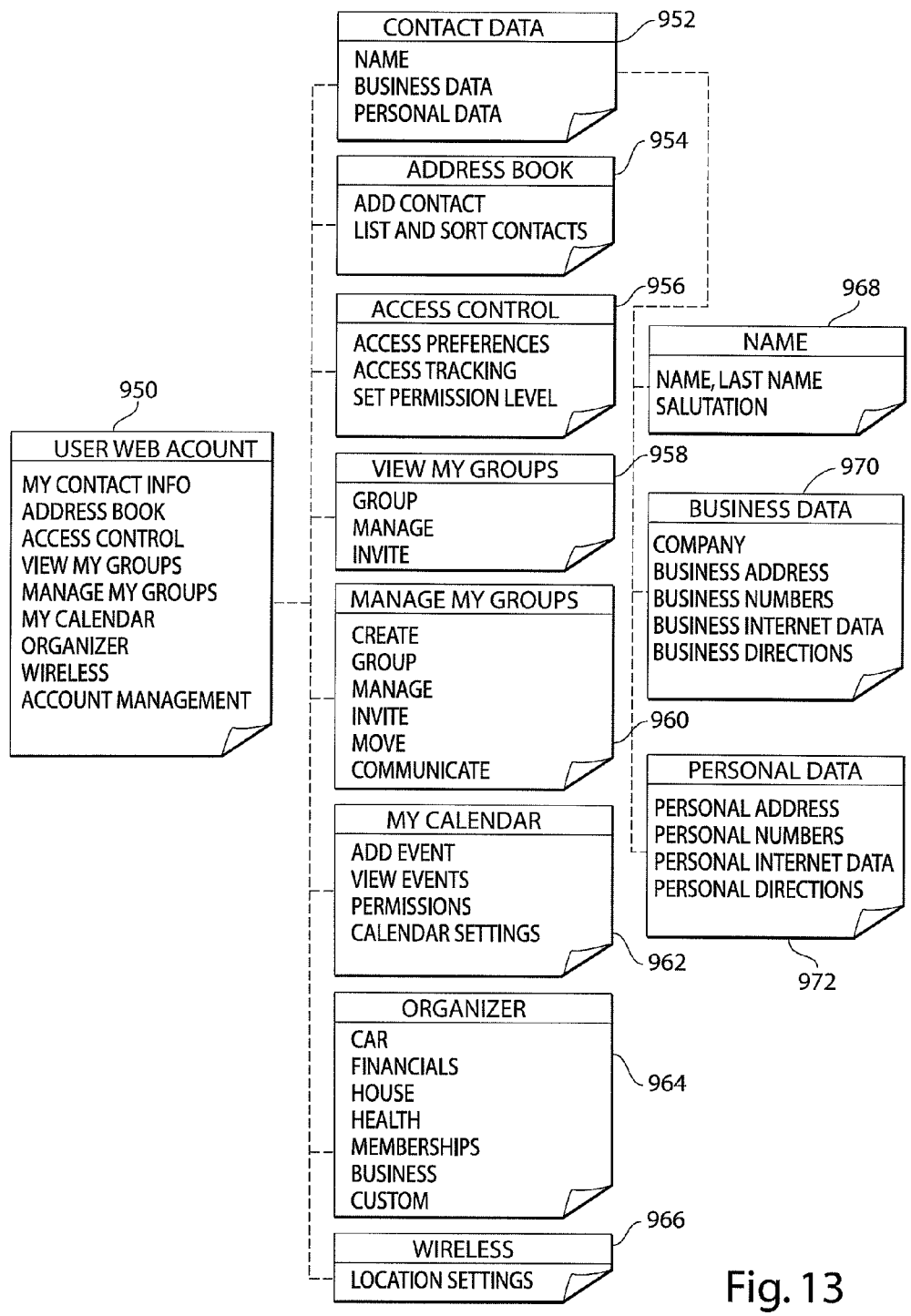
FIG. 13 is a flow chart of a portion of the contact information management system of the invention.

Referring to FIG. 13, a OnePIN™ system user can use both his/her web account and a wireless device to store and manage contact information. The OnePIN web account system 950 includes fields for entry of Contact data 952, an Address Book 954, an Access Control 956, a View My Groups field 958, a Manage My Groups field 960, a Calendar 962, an Organizer 964, and a Wireless field 966. A OnePIN™ user logs onto the internet to set up, access, and maintain the user's OnePIN account when the user chooses not to update via the wireless device.

The Contact Data field 952 includes options for entry of name 968, business data 970, and personal data 972. Entry of a name 968 can include entry of a title. Business Data 970 can include company, address, numbers, internet data, email data, and directions to the business address. Personal Data 972 can include a personal address, numbers, internet data, and directions to a home address. Each field in the Contact Data field 952 can be marked as public, restricted, or blocked. Other demarcations are possible.

The Address Book 954 allows the addition of contacts and a list or sort function of the contacts in the user's OnePIN™ account. The Address Book 954 contains the unique identifiers, or OnePIN™ numbers, for all persons that the user has entered into the synchronizer on his/her computer or phone; for all persons that the user has received a phone call from and automatically synchronized to the web address book and phone address book; and all persons the user has added to the OnePIN™ Address Book 954. The Address Book 954 is available to the user over a network from any location worldwide. The Address Book 954 is accessible with a valid login to the user's account which is password protected.

The Access Control field 956 allows entry of access preferences, access tracking, and a set permission level option. Permission levels can be assigned to each OnePIN™ member or to select members of the system. For example, the user can assign a permission level of public only to allow users access to information the user identifies as public, public and restricted to allow users access to information the user identifies as public and restricted, or blocked access to allow no access to select users. A user may also have the option of designating himself as a OnePIN™ OPEN Network member, or as blocked from OPEN Network.

OnePIN™ OPEN operates on the wireless system as a Wireless Directory in conjunction with the web accounts to allow exchange of data of all other OnePIN™ users in a user's Address Book or a remote database. The user's unique identifier is transferred to all other OnePIN OPEN Network members who are within the user's existing address book or PIM. The other OnePIN OPEN Network members are identified by matching email addresses, cell phone numbers or other uniquely identifiable data with the other users located at contact information management system 800 database. The contact information management system 800 also allows the user to automatically search if any existing address book or PIM entry matches to other system members within the contact information management system 800 database. The matching users are entered to the user's address book automatically. Then, user can synchronize new additions to the synchronizer, then to his personal computer, wireless device and to PIM.

The View My Groups field 958 allows the setup and alteration of groups of users that are affiliated. Groups can be added, managed, or invited to join other groups of users, for example. The user can allow permission levels to particular groups rather than individuals. The Manage My Groups field 960 can be used in conjunction with the View My Groups field 958 to move groups or communicate with groups via the OnePIN™ account.

The My Calendar field 962 allows the user to add events, view events, add or delete permissions, and modify calendar settings for the user's calendar.

The Organizer field 964 comprises a plurality of options for the user to enter information related to the user's car, financials, house, health, memberships, and business. For example, if the user chooses "Car" option, he may enter his or her car's plate number, insurance provider, provider phone number, contact number, policy number, policy expiration date, contact phone number, address and email address. The user may customize the Organizer field 964 to add additional fields of information that the user would like stored for access. Organizer fields are accessible by the user and protected by an encryption technology such that the user can access his or her data. Organizer data is encrypted by the user's password. The user can access the organizer by signing in to his or her account through a personal computer or a wireless device via an internet or wireless network.

The Wireless field 966 allows the user to set location settings for his/her wireless device for direct access to other users. For example, country codes can automatically be dialed for the user when the user wishes to make calls internationally. The user can enter all RFID's of the wireless devices he/she owns. For example, the RFID's can be typed into the available fields. A remote database server (as in FIG. 14) can link the RFID with the user contact information. A second user requesting the RFID transfers his/her contact information to the first user.

Figure 14:
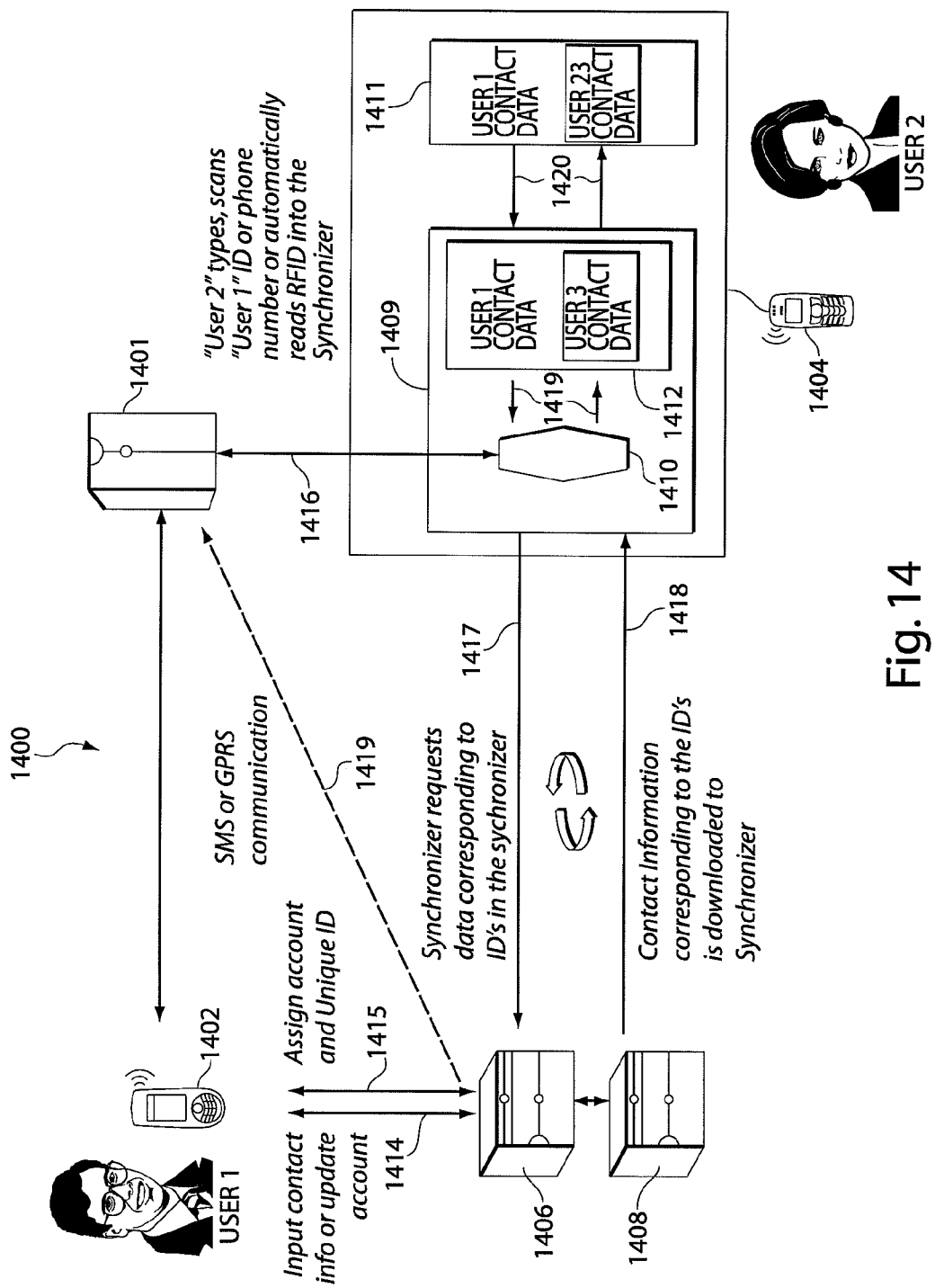
FIG. 14 is a diagram of an alternative wireless system used in embodiments of the invention.

Referring to FIG. 14, a wireless contact management information system 1400 includes a first user phone 1402, a second user phone 1404, a remote computer 1406, a database 1408 and a wireless service provider computer network 1401. The network 1401 is composed of switches, servers and database servers. The remote computer 1406 is coupled to the database 1408. As in FIG. 9, the first user phone 1402 and the second user phone 1404 are connected to the remote computer 1406 and database 1408 over a wireless network. In the embodiment shown in FIG. 14, the second user phone 140 contains a USIM card 1409 that enables the second user phone 1404 access to the remote computer 1406 and remote database 1408 over the wireless network, phone operator network 1401 and internet. The first user phone 1402, as well as other user phones on the wireless network, can include a USIM Card, USIM Card address book, phone address book or PIM and a wireless synchronizer. The data communication in between the phone and the remote server and database server uses standard wireless communication protocols such as SMS messaging system, GPRS, TCP/IP or a derivative of these protocols.

Each wireless device, such as the first user phone 1402 and the second user phone 1404, is linked to the database 1408 through the synchronizer 1410. The first and second user phones 1402, 1404 interact with the database 1408 via a web connection, phone operator network or a wireless network through remote computer 1406. The second user phone 1404 includes a USIM card 1409. The USIM Card 1409 is integrated into the phone and phone software and operates as a part of the phone's systems for interaction with the wireless service provider computer network 1401. The first user phone 1402 also includes USIM Card 1409. The Synchronizer software 1410 may be pushed into the USIM Card 1409 and may be installed into the first user phone 1402 and second user phone 1404 by the phone network operator or may be preinstalled prior to phone or USIM Card purchase. The second user phone 1404 also includes a synchronizer 1410 to allow maintenance of contact information received from the remote computer 1406 and database 1408. In addition, the USIM Card 1409 includes a USIM address book file 1412. Further, the second user phone 1404 includes a phone address book 1411. Phone address book 1411 accesses the USIM address book 1412 and provides a user interface for the USIM address book. The first user phone 1402, as well as other user phones coupled to the wireless network, may also include a synchronizer 1410. The remote computer 1406 may include a synchronizer 1410 in place of or in addition to synchronizers in the user phones.

The synchronizer 1410 and the USIM address book 1412 can be a single software program. The USIM Card 1409 can also be a different type of information storage and execution medium such as a chip or a variation of a Smart Card. The USIM Card 1409 can also be another integrated smart card or chip within a phone. The USIM Address Book 1412 may be replaced with another type of file or software program to manage the addresses.

A method of using the contact information management system 1400 over a wireless network is now described. With reference to FIG. 14, the user of the first user phone 1402 (hereinafter "User 1") connects to the remote computer 1406 and inputs contact information or updates contact information pertinent to User 1 at stage 1414. If an account and user identifier is not already assigned to User 1, at stage 1415, a unique identifier is assigned. The registration can be completed over a personal computer system or through the phone operator systems automatically during or after the phone or USIM Card purchase.

At stage 1416, the user of the second user phone 1404 (hereinafter "User 2") types or scans the User 1 unique identifier or phone number into the user interface of synchronizer 1410 of the second user phone 1404. User 1 may send the User 1's unique identifier by beaming to the second user phone 1404, using each phone's integrated wireless infrared component. Alternatively, User 2 may read the RFID of the User 1 phone 1402, using each phone's integrated wireless RFID component. A communication from User 1 is sent to User 2 with a display of User 1's phone number and/or unique identifier. Preferably, the synchronizer 1410, intercepts the "Add Contact to Address Book" event of the phone's "Send/Receive Business Card" beaming function. Then the User 1 phone number and/or unique identifier is extracted from the "Business Card". The synchronizer and the phone address book may contain user identifiers and phone numbers for users of the contact management system other than User 1.

At stage 1417, Synchronizer 1410 of the phone 1404 requests data corresponding to User 1 from the database of the remote computer 1406. At stage 1418, contact information corresponding to the personal identification of User 1 is downloaded to the wireless synchronizer 1410 of the second user phone 1404. At stage 1419, the information retrieved from the database 1408 is sent from the remote computer 1406 to the phone 1404, and contact information for users corresponding to the unique user identifiers contained in the request in step 1417 is updated in the USIM address book 1412 and phone address book 1411. User 2 accesses his/her USIM address book 1412 or phone address book 1411 to acquire updated contact information related to User 1. The request provided in step 1417 and 1418 can be for the contact information of User 1 or for contact information of several users, each of whom is identified by a unique user identifier or phone numbers which are linked to the individuals within the remote database server 1408. Users that have been assigned unique user identifiers may access the database through the remote computer 1406 to edit the contact information contained in the web database.

At stage 1416, if the unique identifier that has been entered to the User 2 Synchronizer is a phone number, then the synchronizer 1410 of the second user phone 1404 requests data corresponding to User 1's phone number from the database of the remote computer at stage 1417. The remote database 1408 matches the phone number and the unique number of User 1 and sends the relevant information to the phone 1402 in step 1418. The information can be packaged in several SMS messages and transferred to and from the phone. The SMS messages are configured by the Wireless Operator in such a way that the communication between the remote server and the phone is filtered and transparent to the users.

In one embodiment of the present invention, a copy of all unique numbers in the synchronizer may also be stored in the remote database and be accessible by User 2 through a login screen of the remote computer 1406. Thus, User 2 can access the remote computer 1406 and remote database 1408 from a computer or other wireless device other than the second phone 1404 to obtain contact information.

The contact information, unique identifiers and phone numbers can be hosted within phone operator computers. Alternatively, the unique numbers and physical location of the contact information (i.e. the hosted server IP address and http address of the servers) for each unique user data and the relation between the unique users are hosted within the remote database 1408. For example, the remote computer 1406 and the remote database 1408 host the logic such that when User 2 demands the information of User 1, the remote server 1406 and remote database 1408 locate the physical location of the contact information and request the information be transferred to User 2 from the operator's computer network 1401.

Figure 15:
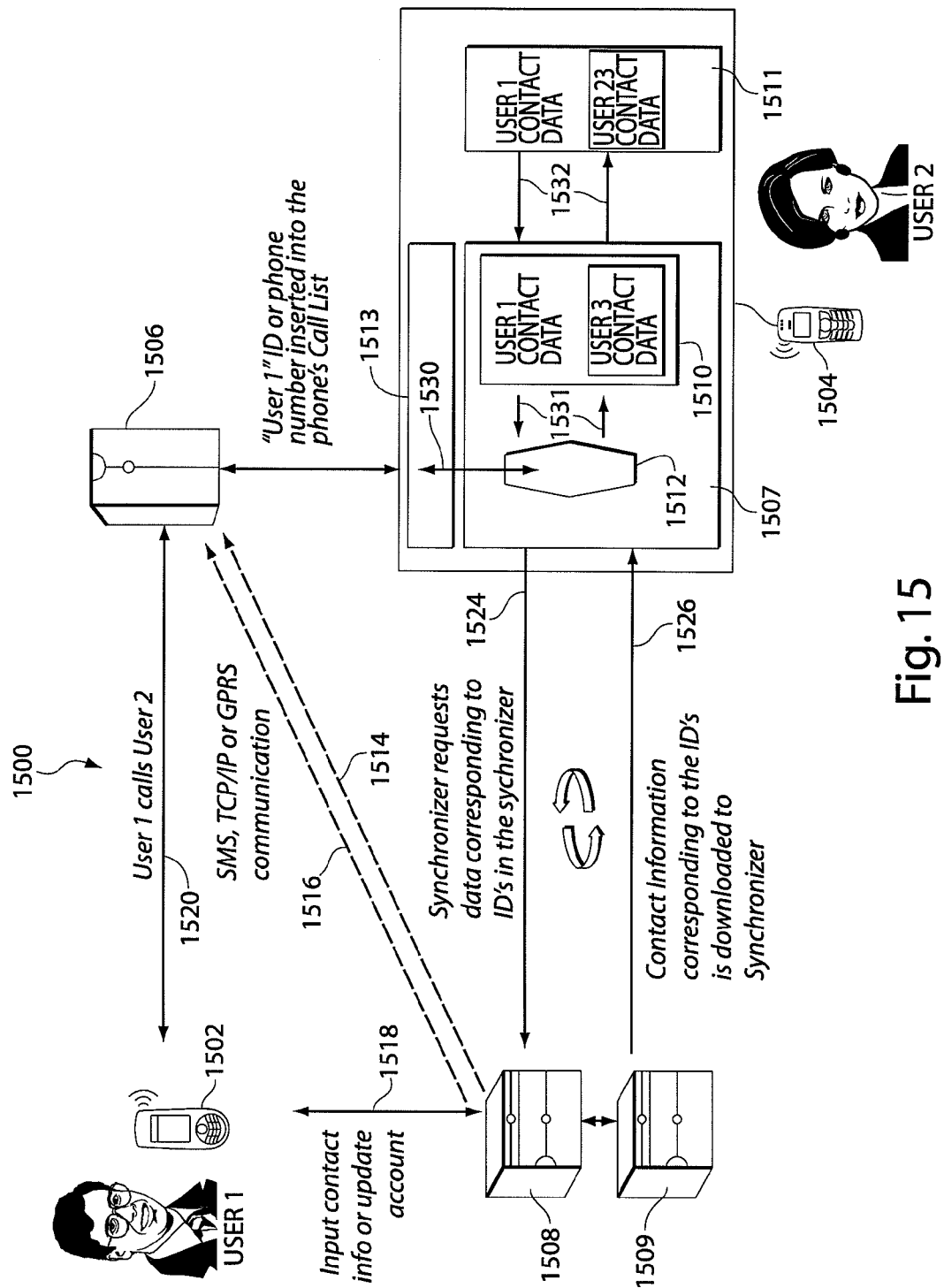
FIG. 15 is a diagram of an alternative wireless system used in embodiments of the invention.

Referring to FIG. 15, the contact information management system 1500 includes a first user phone 1502, a second user phone 1504, a wireless service provider computer network 1506, and a remote computer 1508 coupled to a remote database 1509. The second user phone 1504 includes a USIM Card 1507, a USIM address book 1510, a phone address book or PIM 1511 and a wireless synchronizer 1512. The first user phone 1502, as well as other user phones on the wireless network, can include a USIM Card, USIM Card address book, phone address book or PIM and a wireless synchronizer. The remote computer 1508 may include a synchronizer 1512 in place of or in addition to synchronizers in the user phones. The synchronizer 1512 and the USIM address book 1510 can be a single software program. The USIM Card 1507 can also be a different type of chip or a variation of a Smart Card. The USIM Card 1507 can also be another integrated smart card or chip within a phone. The USIM Address Book 1510 may be replaced with another type of file or software program to manage the addresses. The wireless service provider computer network 1506 may include a OTA (Over the Air) network within a UMTS network.

Wireless provider 1506 assigns a unique identifier for all its users through the system using remote computer 1508 coupled with remote database 1509. The phone number can be used as the unique identifier. Otherwise, the phone numbers are linked to the users' automatically assigned random unique identifiers within the remote database 1509. The contact information management system software (synchronizer 1512) is remotely downloaded to the list of subscribers' USIM Cards.

When a new wireless device user, such as User 1 of the first user phone 1502 and User 2 of the second user phone 1504, buys or subscribes to a service plan, purchases a new phone or USIM Card from the wireless service provider 1506, User 1 and User 2 are assigned a unique user identifier by the wireless service provider 1506, using remote computer 1508 coupled with remote database 1509. The synchronizer 1512 is downloaded to each of the first user phone 1502 and the second user phone 1504 at the point of purchase. This registration can be completed over a personal computer system or through the phone operator systems, such as an OTA (Over the Air) system, automatically during or after the phone or USIM Card purchase.

At stage 1516, registration of a new user to the contact information management system 1500 is accomplished through the wireless service provider 1506. The remote computer 1508 receives information from the wireless service provider and provides the unique identifier for each user, shown at stage 1514. If the user already has a unique identifier, the wireless service provider 1506 registers the user's existing identifier to the phone or other wireless device. Thereafter, User 1 and User 2, as subscribers to the network of the wireless service provider 1506, can input contact information or update account information contained in the remote computer 1508, as shown by stage 1518.

Users that have been assigned user identifiers may access the database through the remote computer to edit the contact information contained for them in the web database at any time. The method is substantially similar to the method of FIGS. 2A and 2B, discussed above and wherein contact with the remote database is made via separate user computers.

A method of using the wireless contact information management system 1500 between users is now described. User 1 places a call to User 2 via the wireless service provider 1506, as shown in stage 1520. The wireless service provider 1506 inserts the phone number of User 1 to the call list 1513 of the User 2 phone. The synchronizer software 1512 of the User 2 phone 1504 is initiated, as shown in stage 1530. Synchronizer 1512 of the second user phone 1504 collects the incoming call number from the incoming call list 1513. During the phone conversation, the synchronizer 1512 of the second user phone 1504 connects to the remote server 1508 coupled with remote database 1509.

As an option, at stages 1524 and 1526, the synchronizer 1512 requests data from the remote computer 1508 corresponding to the phone number. The remote computer 1508 sends contact information corresponding to the unique identifier to the wireless synchronizer 1512 and inputs the data into the USIM address book 1510 and phone address book 1511 through operator network 1506.

Alternatively, at stages 1514 and 1516, the synchronizer 1512 requests data from the operator network 1506 corresponding to the phone number. The remote computer 1508 sends contact information corresponding to the unique identifier to the wireless synchronizer 1512 and inputs it into the USIM address book 1510 and phone address book 1511 through operator network 1506.

Upon completion of a phone conversation, the USIM synchronizer is activated and the User 2 phone 1504 displays an inquiry or other prompt to ask the User 2 whether to add the User 1 to the User 2 address book. User 2 may reply by choosing a "Yes" or "No" answer. If the user selects the "Yes" option, the contact information of User 1 is entered to the USIM address book 1510 of the User 2 phone 1504. If User 2 selects "No", the USIM address book 1510 is left untouched.

User 2 is prompted to enter the access level at which User 1 will be provided access. This step ensures that User 1 has the permission to access User 2 contact information at a level determined by User 2. User 2 has three access level options to designate to User 1: "Public Data, Public and Private Data, Block User". "Public Data" option allows User 1 to access User 2's contact information denoted as "Public" at remote database 1509. "Public and Restricted Data" option allows User 1 to access User 2's contact information denoted as "Public and Restricted" at remote database 1509. Choosing "Block User" option disables User 1 accessing any of User 2 data in remote database 1509, until User 2 allows User 1 to have another access permission level in the future.

User 1's contact information is accessible in the USIM address book 1510 and phone address book 1511 of User 2. User 2 did not manually enter the contact information of User 1, but the second user phone 1502 contains the contact information via the transfer of the data from the remote computer 1508. The second user phone 1504 contains contact data related to User 1 that was entered remotely into the remote computer 1508 by User 1. Alternatively, User 2 may enter User 1's unique identifier into his/her wireless phone using the manual entry method described in FIG. 14.

User contact information downloaded to the synchronizer 1512 of the second user phone 1504 are updated as the synchronizer 1512 requests information from the remote computer 1508. Requests from the synchronizer 1512 are answered with fresh data from the remote computer, which updates the USIM address book 1510 and phone address book 1511 of the second user phone 1504.

The synchronizer software 1512 that is installed in each wireless device is triggered automatically. Upon automatic trigger, the synchronizer collects the existing phone numbers in the USIM address book 1510 and phone address book 1511. Then, the synchronizer software requests the contact information matching these phone numbers from remote server 1508 coupled with remote database 1509. Requests from the synchronizer 1512 are answered with data from the remote computer, which updates the USIM address book 1510 and phone address book 1511 of the second user phone 1504.

During synchronization, the USIM address book 1510 file structure is uploaded to the remote server 1509 and stored in the User 2 account profile. During a synchronization process, stored information is compared with the new USIM address book 1510 file structure of the User 2 phone. The system transfers the contact information into the correct location within the USIM address book 1510 file structure. The system remembers the physical location of each contact entry within the USIM address book 1510, allowing the contact management system to recognize the changes that may have occurred due to a manual entry into the USIM address book 1510. The contact management system 1500 uses the standard file structure of third generation phone system USIM address book specifications determined by "The 3rd Generation Partnership Project" (3GPP) and the phone address book specifications determined by "The Third Generation Partnership Project 2" (3GPP2) standards organizations.

In step 1520, User 1 calls User 2 over a wireless network. After the call is completed, in steps 1514, 1516 and 1530, based on permissions, contact information is exchanged and automatically inserted into their phonebooks. In step 1518, User 1 changes his contact information in his wireless phone or over the internet by accessing the remote server. User 1's new contact information is inserted into User 2's phone address book automatically in step 1531 and 1532.

Figure 16:
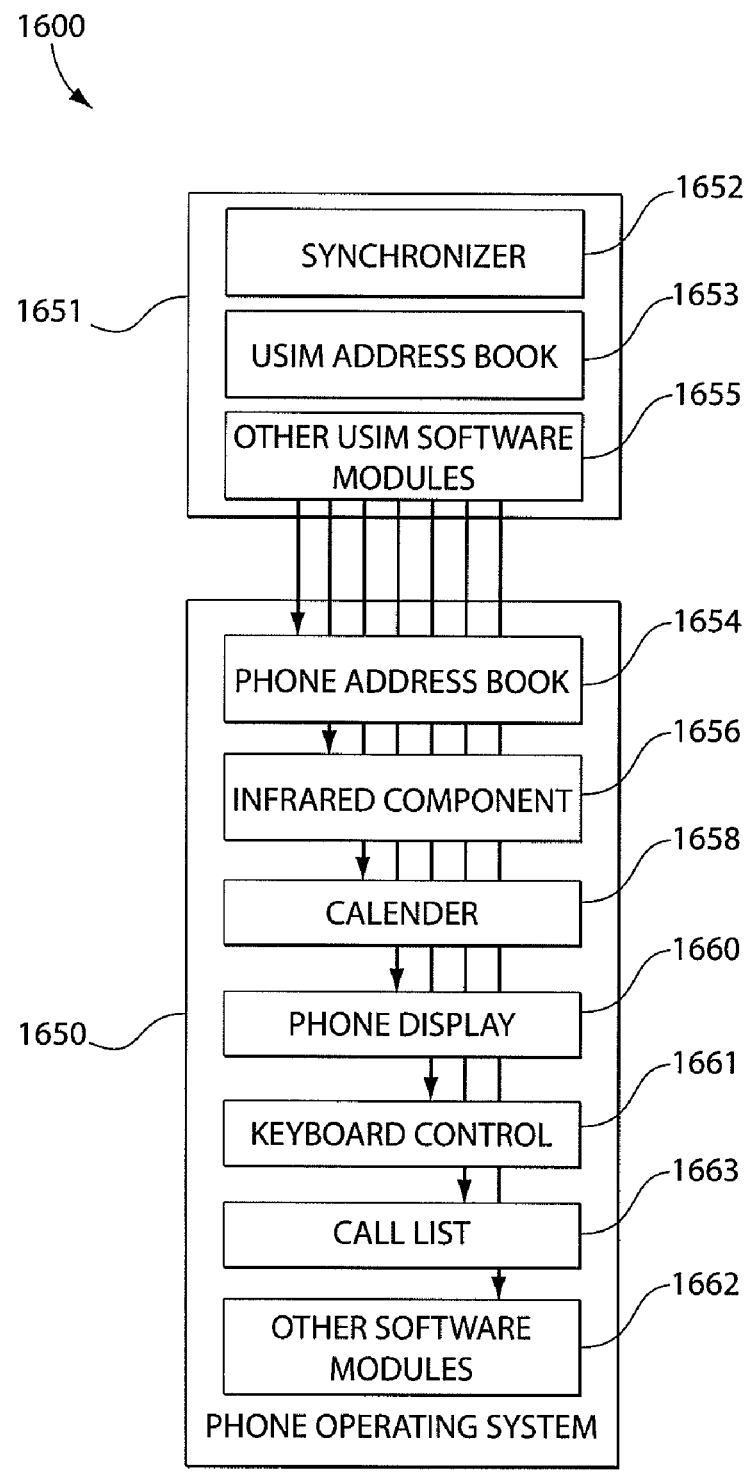
FIG. 16 is a block diagram of a device for use in a system of the invention.

Referring to FIG. 16, an operating system 1600 employing the contact information management system 1650 is shown in conjunction with the USIM Card 1651 smart card module. Although the operating system 1650 is presented as a phone operating system, the operating system can be effective for PDA's or other wireless devices, or for IP based landline phones. The USIM smart card 1651 includes a wireless synchronizer 1652, USIM address book 1653 and other USIM Card software modules 1655. The operating system 1650 includes a phone address book 1654, an infrared component 1656, a calendar 1658, a phone display 1660, a keyboard control 1661, a call list (incoming and outgoing) 1663, and other software modules 1662.

The USIM card 1651 communicates to the operating system 1650 through specifications determined by "The 3rd Generation Partnership Project" (3GPP). Synchronizer 1652 communicates to incoming and outgoing call list 1663 of the device. After each incoming call or outgoing call to the device, the call list is updated. The change in the call list automatically triggers wireless synchronizer 1652 and data exchange with a remote database starts. The USIM address book 1653 interacts with the wireless synchronizer 1652 to receive, store, and display updated contact information. The phone address book 1654, the infrared component 1656, the calendar 1658, and the phone display 1660 interact with the USIM Card 1651 to receive, store, and display updated and new information.

The wireless synchronizer 1652 is able to beam (send and receive) a user's unique identifier to other users' wireless devices via the infrared component 1656. If the device is equipped with a RFID, then the phone collects these RFID signals and stores it in the wireless synchronizer 1652. Similar to phone numbers, these RFIDs are matched with the owners' of the RFIDs and their contact information is transferred into the USIM address book 1653. The wireless synchronizer 1652 also adds new unique identifiers and phone numbers through manual entry of the unique identifier through the phone display 1660 and keyboard control 1661. Phone numbers and other contact information of a user are available through the USIM address book 1653 or through the phone address book 1654.

During automatic synchronization, the USIM address book 1653 file structure is uploaded to the remote server and stored in user's account profile and compared with previous file structure. The file structure comparison feature enables the system to transfer the contact information into the correct location within the USIM address book 1653 file structure, allowing the contact management system to recognize the changes that may have occurred due to a manual entry into the USIM address book 1653.

Figure 17:
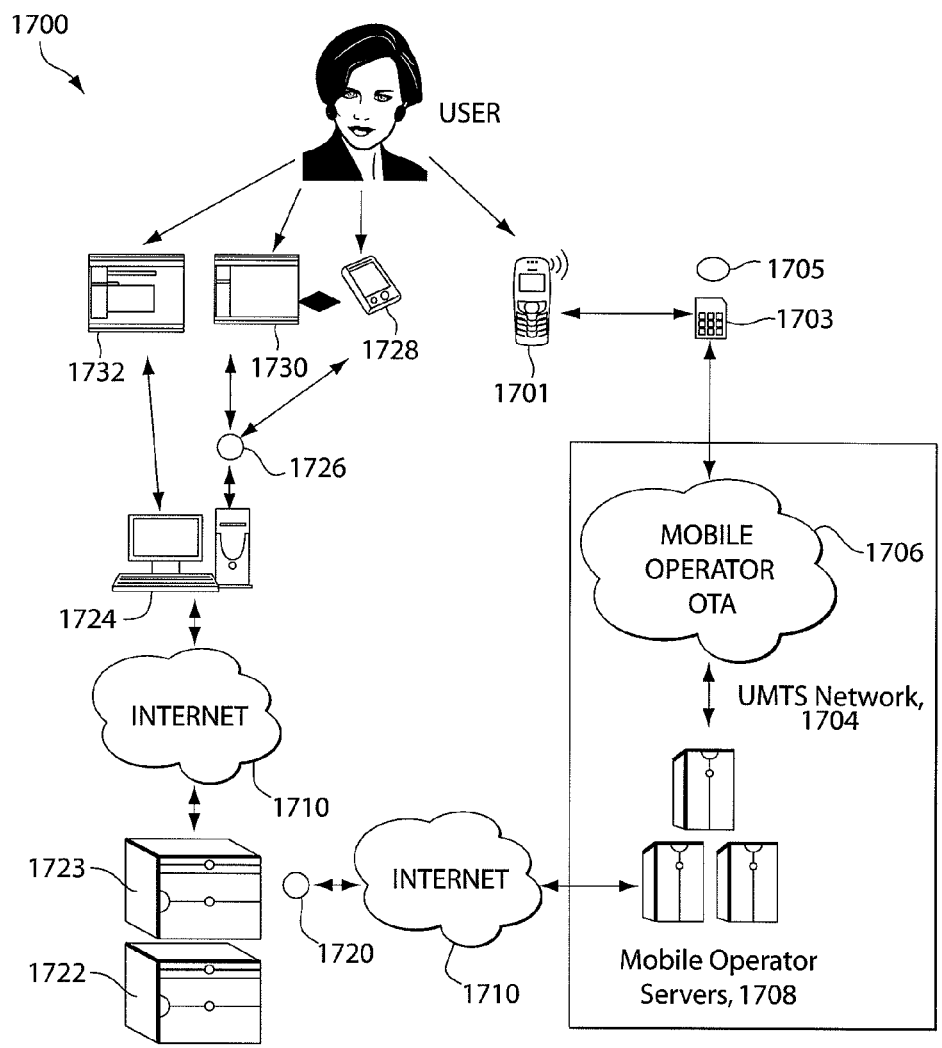
FIG. 17 is an information flow chart of a function of the device in FIG. 16.

Referring to FIG. 17, the wireless contact information management system 1700 illustrates the several components of invention and their connectivity to several devices as an example within UMTS Network. The system includes a user phone 1701, a USIM Card 1703, a USIM Card Synchronizer 1705, a user personal computer 1724, a PC synchronizer 1726, a user PDA 1728, a user PIM 1730, a user web account 1732, a wireless service provider computer network 1708, a remote computer 1722 coupled to a remote database 1723 and remote server web services 1720.

USIM Card Synchronizer 1705 resides on the USIM Card 1703. The user phone 1701 and USIM Card 1703 are connected to the remote computer 1722 coupled to a remote database 1723 through the wireless service provider computer network 1708 in conjunction with the wireless service provider OTA (Over the Air) system 1706. Wireless service provider OTA communicates with the remote server 1722 coupled to a remote database 1723 over the Internet 1710 through remote server's web services 1720 component. User PIM 1730 and the PC Synchronizer 1726 resides on user personal computer 1724. User can access his or her account, which includes contact information and permission settings, by his or her user web account 1732 and using personal computer 1724 through the Internet 1710. A specialized version of the synchronizer 1726 may also be stored in a user PDA 1728.

In an embodiment of the invention, the system described is an UMTS Network 1704. This system can be another type of mobile network, such as CDMA2000. In other type of networks, the USIM can be a SmartCard or a chip with a similar specifications. This unit may be a separate unit from the phone or an embedded chip within the phone.

In embodiments of the invention, the unique user identifier can be: 1) the mobile phone number of a user, 2) another unique number randomly assigned identifier to a user, or 3) any other communication standard used to identify a user uniquely (i.e. Email address, Instant Messenger address, Fax number). In some embodiments of the invention where the unique identifier is different than the users' phone number, the remote database can link the phone number and the other unique number of the user such that the users are defined within the remote database.

Embodiments of the invention are described for use with wireless phones. The contact information system can be used with other wireless devices and with landline telephones. Embodiments allow transfer of contact information to and from a central database, and between cell phones or other wireless devices. Information added by a first user is accessible to a second user. Additional functions for the operating system are possible and envisioned.

In some embodiments of the present invention, both the synchronizer and the database maintain an update log indicating the last time that contact information for a user has been updated. The update log in the database indicates the last time that the user edited his contact information in the database, and the update log in the synchronizer indicates the last time that the contact information in the wireless device address book or PIM for the user has been updated. In these embodiments, contact information for a first user is not updated in the wireless device address book or PIM of a second user unless the date in the update log of the database is more recent than the date in the update log of the synchronizer of the second user.

In embodiments of the present invention, users can utilize the synchronizer to periodically update contact information in the wireless device address book or PIM. The user also can synchronize the wireless address book to their Personal Computer and to their PIMs such as Outlook or ACT! by using the personal computer synchronizer. In one embodiment, the synchronizer is configured to automatically contact the remote computer and database on a periodic basis to update information in the wireless device address book or PIM. In this embodiment, the synchronizer can access the remote computer over the internet using the web browser in the personal computer in a manner that is substantially transparent to a user of the personal computer.

Embodiments of the present invention discussed above provide an electronic personal contact information management system that allows users of the system to easily maintain up-to-date contact information on other users of the system. In embodiments of the present invention described above, a user of the system uses business cards having the user's unique user identifier encoded thereon to pass the user's unique user identifier to other users. In other embodiments, the user's unique user identifier may be contained on documents other than business cards such as on letterhead for the user's business or on a user's resume, and may also be contained within e-mails and other electronic documents such as a vcard. In other embodiments, user identifiers may be used in management systems of the present invention to manage the ordering of replacement parts in industries such as the automotive industry. In still other embodiments, known numbering systems, such as the ISDN numbering scheme used to identify books, may be used with systems of the present invention to allow users to update information related to books or other items.

The methods and systems of embodiments of the present invention described above allow users to communicate business contact information to other users. Other embodiments of the present invention may be used in a similar manner to allow users to communicate personal contact information to friends and acquaintances. In still other embodiments, businesses may use contact information systems of the present invention to provide customers, vendors, or others with contact information regarding a particular position within the business. For example, a unique user identifier may be assigned to a business's sales manager, and the unique user identifier may be included on the sales manager's business card. Customers of the business may include the user identifier of the sales manager in a synchronizer and/or PIM as described above and the customers can receive and update contact information of the sales manager. If a new sales manager is appointed by the company to replace the existing sales manager, then the contact information for the sales manager position in the system database can be updated to include the new sales manager's name. The name of the sales manager in the customer's PIM will be updated upon the next synchronization by the customer with the system database.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. An information management method comprising steps of:
   assigning a first user a unique user identifier;
   storing information related to the first user in a remote database operatively coupled to a remote device; and
   enabling a second user to access the remote database over a wireless network using a second device to retrieve the information related to the first user by retrieving the unique user identifier,
   wherein the second device includes at least one of a Subscriber Identity Module, a UMTS Subscriber Identity Module (USIM), a smart card or an embedded chip through which the information is passed to the second device.

2. The information management method of claim 1 wherein the unique user identifier includes a phone number.

3. The information management method of claim 1, wherein enabling access to the remote database to retrieve information related to the first user includes electronically reading the Radio Frequency Identification (RFID) of the first device into the second device.

4. The information management method of claim 1, wherein enabling a second user to access the remote database over a wireless network using a second device to retrieve the information related to the first user by retrieving the first user's first device RFID.

5. The information management method of claim 1, wherein enabling access to the remote database includes retrieving the unique user identifier electronically by receiving a communication from the first user.

6. The information management method of claim 5, further comprising automatically transferring the unique identifier to the second device during the communication from the first user.

7. The information management method of claim 6, wherein receiving a communication from the first user includes informing the second user's device of the first user's unique user identifier and the first user's phone number.

8. The information management method of claim 7, further comprising automatically transferring a second user unique identifier and second user phone number to a first device during the communication from the first user.

9. The information management method of claim 1, wherein enabling access to the remote database includes retrieving a phone number associated with the first user.

10. The information management method of claim 1, wherein enabling access to the remote database to retrieve information related to the first user includes manually entering the unique user identifier or the phone number of the first user into the second device.

11. The information management method of claim 1, wherein the step of assigning includes subscribing to a wireless service provider and wherein the wireless service provider assigns the unique user identifier by accessing the remote database of the remote device.

12. The information management method of claim 1, further comprising automatically transferring data stored in the second device to the remote database and forming an association of the data associated with the second device with the second user.

13. The information management method of claim 1, further comprising:

establishing a database of user information in the remote database, and updating information in the remote database of the remote device by accessing information in a second database of the second device.

14. An information management system comprising:

a remote device;

a remote database operatively coupled to the remote device, the remote database containing contact information for each of a plurality of users of the information management system, wherein each of the users is assigned a unique user identifier, and the information for each user is stored along with the unique user identifier of the user in the remote database;

wherein the remote device includes:

at least one of a Subscriber Identity Module, a UMTS Subscriber Identity Module (USIM), a smart card or an embedded chip that interfaces with a wireless network to allow users of the information management system to access the remote device;

a database interface module that coordinates transfer of data between the remote database and the remote device; and an application module to enable a wireless network user to access the remote database over the wireless network using a second network device to retrieve information in the remote database related to a first user having an assigned unique user identifier.

15. The information management system of claim 14, wherein the second network device includes a second database, and the application module includes instructions to provide updating of information in the second database with information in the remote database.

16. The information management system of claim 15, wherein the second device includes a synchronizer for synchronizing information between the second database of the second network device and the remote database.

17. The information management system of claim 16, wherein the second network device transfers the unique user identifier of a second user to the first network device, and wherein the first network device transfers the unique user identifier of the first user to the second network device.

* * * * *

UNITED STATES PATENT AND TRADEMARK OFFICE
CERTIFICATE OF CORRECTION

| | | |
|---|---|---|
| PATENT NO. | : 7,349,907 B2 | Page 1 of 1 |
| APPLICATION NO. | : 11/056022 | |
| DATED | : March 25, 2008 | |
| INVENTOR(S) | : Feyzi Celik | |

It is certified that error appears in the above-identified patent and that said Letters Patent is hereby corrected as shown below:

On the Title Page, Item (63) in the Related U.S. Application Data section, replace the text of the first paragraph with:

Continuation-in-part of patent application U.S.S.N. 10/879,331, filed June 29, 2004, now U.S. Pat. No. 7,509,349, which is a continuation-in-part of patent application U.S.S.N. 10/657,757, filed September 8, 2003, now U.S. Pat. No. 7,296,036, which is a continuation of patent application U.S.S.N. 10/123,788, filed on April 16, 2002, now U.S. Pat. No. 6,654,768, which is a continuation of patent application U.S.S.N. 09/223,129, filed December 30, 1998, now U.S. Patent No. 6,374,259.

Column 1, lines 5-14, replace the text with:

Related Applications

This application is a continuation-in-part of patent application U.S.S.N. 10/879,331, filed June 29, 2004, now U.S. Patent No. 7,509,349, which is a continuation-in-part of patent application U.S.S.N. 10/657,757, filed September 8, 2003, now U.S. Patent No. 7,296,036, which is a continuation of patent application U.S.S.N. 10/123,788, filed on April 16, 2002, now U.S. Pat. No. 6,654,768, which is a continuation of patent application U.S.S.N. 09/223,129, filed December 30, 1998, now U.S. Patent No. 6,374,259, which claims priority from U.S.S.N. 60/102,614, filed October 1, 1998, each of which, with the exception of U.S.S.N. 10/123,788, now U.S. Pat. No. 6,654,768, is incorporated herein by reference.

Signed and Sealed this
Nineteenth Day of June, 2012

David J. Kappos
*Director of the United States Patent and Trademark Office*